United States Patent
Lee et al.

(10) Patent No.: US 12,477,596 B2
(45) Date of Patent: Nov. 18, 2025

(54) APPARATUS AND METHOD FOR PERFORMING DYNAMIC MODE SWITCHING IN SHORT RANGE WIRELESS COMMUNICATION SYSTEM

(71) Applicant: LG ELECTRONICS INC., Seoul (KR)

(72) Inventors: Hyeonjae Lee, Seoul (KR); Jongmin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 318 days.

(21) Appl. No.: 18/222,225

(22) Filed: Jul. 14, 2023

(65) Prior Publication Data
US 2024/0023174 A1    Jan. 18, 2024

(30) Foreign Application Priority Data
Jul. 15, 2022   (KR) .................. 10-2022-0087820

(51) Int. Cl.
*H04W 76/10* (2018.01)
(52) U.S. Cl.
CPC ................... *H04W 76/10* (2018.02)
(58) Field of Classification Search
CPC ...................................................... H04W 76/10
See application file for complete search history.

(56) References Cited

U.S. PATENT DOCUMENTS

| | | | |
|---|---|---|---|
| 9,648,518 B2 * | 5/2017 | Chen | H04W 72/541 |
| 2017/0244576 A1 * | 8/2017 | Batra | H04W 56/0025 |
| 2019/0387382 A1 * | 12/2019 | Wojcieszak | H04W 4/80 |
| 2024/0097824 A1 * | 3/2024 | Turner | H04L 1/08 |
| 2025/0113314 A1 * | 4/2025 | Mysore | H04W 56/0015 |

FOREIGN PATENT DOCUMENTS

| | | | | |
|---|---|---|---|---|
| JP | 2019054313 A | * | 4/2019 | H04W 16/14 |
| WO | WO-2023192751 A1 | * | 10/2023 | H04W 24/02 |
| WO | WO-2024240039 A1 | * | 11/2024 | H04W 72/569 |

* cited by examiner

*Primary Examiner* — Yuwen Pan
(74) *Attorney, Agent, or Firm* — BRYAN CAVE LEIGHTON PAISNER LLP

(57) ABSTRACT

According to various embodiments of the present disclosure, a method of operating a first apparatus in a short-range wireless communication system, the first apparatus includes: a first processor corresponding to a host stack; a second processor corresponding to a controller stack; a memory; an input device corresponding to a user interface (UI); an output device corresponding to the UI; and a transceiver, wherein the host stack and the controller stack are connected through a host controller interface (HCI), the method comprising: receiving a switching input from a basic mode to a hybrid mode based on an input of the UI, wherein the first apparatus corresponds to a host, a second apparatus corresponds to a peripheral device, and the first apparatus and the second apparatus are connected through a generic attribute profile (GATT) channel; transmitting a first command message instructing the second apparatus to switch to the hybrid mode, wherein the first command message includes ultra low latency human interface device (ULL HID) parameters; and performing communication with the second apparatus through a connected isochronous stream (CIS) channel in addition to the GATT channel based on the ULL HID parameters.

20 Claims, 11 Drawing Sheets

APPARATUS AND METHOD FOR PERFORMING DYNAMIC MODE SWITCHING IN SHORT RANGE WIRELESS COMMUNICATION SYSTEM

CROSS-REFERENCE TO RELATED APPLICATION

This application is based on and claims priority under 35 U.S.C. 119 to Korean Patent Application No. 10-2022-0087820 filed on Jun. 15, 2020 in the Korean Intellectual Property Office, the disclosure of which is herein incorporated by reference in its entirety.

BACKGROUND OF THE INVENTION

Field of the Invention

The present disclosure relates to an apparatus and method for performing dynamic mode switching in a short-range wireless communication system. Specifically, the present disclosure relates to an apparatus and method for performing dynamic mode switching between a gaming mode and an office mode through a user interface of a host device or a specific button of a peripheral device.

Description of the Related Art

In the existing Bluetooth standard, the reason why a limited number of retransmissions are selected is as follows.

In the case of gaming use, there is no retransmission that meets the requirements at very low latency. Because a limited retransmission (controlled by the HID host) can have zero or more retransmissions, it can allow for the lowest latency and provide some extra robustness at higher latency. The stream date has a "previous use" tag, but "reliable" delivery is not available.

In the case of office use, a "reliable" transmission means required for an expected user experience is required. A specification is required to enable some devices (e.g. keyboard and mouse) to be able to switch between "gaming" report and "office" report.

The advantages of dynamic switching mode for gaming mode and office mode are as follows. Most of the time low latency is not required. Many users my never use it and never miss it. Low latency (limited reliability) is not applicable for nongaming applications. Especially for devices like keyboard and mouse they need to perform in both modes.

Specification and implementation complexity is higher, but only "standard" GATT based protocols are needed.

The advantages of static mode for gaming mode and office mode are as follows. Static mode is simpler to implement than dynamic switching mode, but the static mode does not handle devices used both for gaming and "office". Static mode could possibly be used in a new profile. Application would be able to switch profile instead?=>Pushing complexity "somewhere else".

SUMMARY OF THE INVENTION

In order to solve the above-described problem, the present disclosure provides an apparatus and method for performing dynamic mode switching in a short-distance wireless communication system.

The present disclosure provides an apparatus and method for performing dynamic mode switching between gaming mode and office mode through a user Interface of a host device or a specific button of a peripheral device.

The technical objects of the present disclosure are not limited to the aforementioned technical objects, and other technical objects, which are not mentioned above, will be apparently appreciated by a person having ordinary skill in the art from the following description.

According to various embodiments of the present disclosure, a method of operating a first apparatus in a short-range wireless communication system, the first apparatus comprises: a first processor corresponding to a host stack; a second processor corresponding to a controller stack; a memory; an input device corresponding to a user interface (UI); an output device corresponding to the UI; and a transceiver, wherein the host stack and the controller stack are connected through a host controller interface (HCI), the method comprising: receiving a switching input from a basic mode to a hybrid mode based on an input of the UI, wherein the first apparatus corresponds to a host, a second apparatus corresponds to a peripheral device, and the first apparatus and second apparatus are connected through a generic attribute profile (GATT) channel; transmitting a first command message instructing the second apparatus to switch to the hybrid mode, wherein the first command message includes ultra low latency human interface device (ULL HID) parameters; and performing communication with the second apparatus through a connected isochronous stream (CIS) channel in addition to the GATT channel based on the ULL HID parameters.

According to various embodiments of the present disclosure, a method of operating a second apparatus in a short-range wireless communication system, the second apparatus comprises: a first processor corresponding to a host stack; a second processor corresponding to a controller stack; a memory; a specific switch for input; and a transceiver, wherein the host stack and the controller stack are connected through a host controller interface (HCI), the method comprising: receiving a first command message instructing switching from a basic mode to a hybrid mode based on an input of a user interface (UI) of a first apparatus from the first apparatus, wherein the first apparatus corresponds to a host, the second apparatus corresponds to a peripheral device, and the first apparatus and the second apparatus are connected through a generic attribute profile (GATT) channel, and the first command message includes ultra low latency human interface device (ULL HID) parameters; and performing communication with the first apparatus through a connected isochronous stream (CIS) channel in addition to the GATT channel based on the ULL HID parameters.

According to various embodiments of the present disclosure, a first apparatus in a short-range wireless communication system, the first apparatus comprises: a first processor corresponding to a host stack; a second processor corresponding to a first controller stack; a memory; an input device corresponding to a user interface (UI); an output device corresponding to the UI; and a transceiver, wherein the host stack and the controller stack are connected through a host controller interface (HCI), wherein the memory store instructions for performing operations based on being executed by the first processor and the second processor, and wherein the operations comprises: receiving a switching input from a basic mode to a hybrid mode based on an input of the UI, wherein the first apparatus corresponds to a host, a second apparatus corresponds to a peripheral device, and the first apparatus and the second apparatus are connected through a generic attribute profile (GATT) channel; transmitting a first command message instructing the second apparatus to switch to the hybrid mode, wherein the first command message includes ultra low latency human interface device (ULL HID) parameters; and performing communication with the second apparatus through a connected isochronous stream (CIS) channel in addition to the GATT channel based on the ULL HID parameters.

In order to solve the above problems, the present disclosure may provide an apparatus and method for performing dynamic mode switching in a short-range wireless communication system.

The present disclosure may provide an apparatus and method for performing dynamic mode switching between gaming mode and office mode through a user interface of a host device or a specific button of a peripheral device.

BRIEF DESCRIPTION OF THE DRAWINGS

The drawings attached below are intended to aid understanding of the present disclosure, and may provide embodiments of the present disclosure together with a detailed description. However, the technical features of the present disclosure are not limited to specific drawings, and features disclosed in each drawing may be combined with each other to constitute a new embodiment. Reference numerals in each drawing may mean structural elements.

DETAILED DESCRIPTION OF THE EMBODIMENTS

In various embodiments of the present disclosure, "A or B" may mean "only A", "only B" or "both A and B." In other words, in various embodiments of the present disclosure, "A or B" may be interpreted as "A and/or B". For example, in various embodiments of the present disclosure, "A, B, or C" may mean "only A", "only B", "only C", or "any combination of A, B, C".

A slash (/) or comma used in various embodiments of the present disclosure may mean "and/or". For example, "A/B" may mean "A and/or B". Accordingly, "A/B" may mean "only A", "only B", or "both A and B". For example, "A, B, C" may mean "A, B, or C".

In various embodiments of the present disclosure, "at least one of A and B" may mean "only A", "only B", or "both A and B". In addition, in various embodiments of the present disclosure, the expression "at least one of A or B" or "at least one of A and/or B" may be interpreted as "at least one of A and B".

In addition, in various embodiments of the present disclosure, "at least one of A, B, and C" may mean "only A", "only B", "only C", or "any combination of A, B, and C". In addition, "at least one of A, B, or C" or "at least one of A, B, and/or C" may mean "at least one of A, B, and C".

Figure 1:
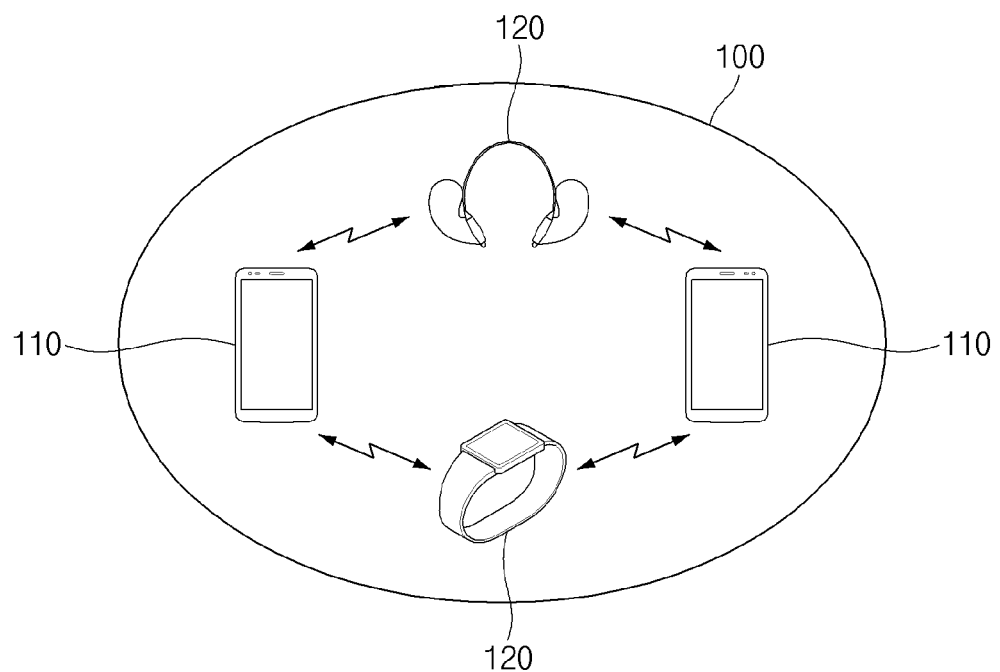
FIG. 1 is a schematic view illustrating an example of a wireless communication system using a Bluetooth low energy technology to which the present disclosure is applicable.

FIG. 1 is a schematic view illustrating an example of a wireless communication system using a Bluetooth low energy technology to which the present disclosure is applicable.

A wireless communication system 100 includes at least one server device 120 and at least one client device 110.

The server device and the client device perform Bluetooth communication using a Bluetooth low energy (BLE) technology.

First, compared with a Bluetooth basic rate/enhanced data rate (BR/EDR), the BLE technology has a relatively small duty cycle, may be produced at low cost, and significantly reduce power consumption through a low data rate, and thus, it may operate a year or longer when a coin cell battery is used.

Also, in the BLE technology, an inter-device connection procedure is simplified and a packet size is designed to be small compared with the Bluetooth BR/EDR technology.

In the BLE technology, (1) the number of RF channels is forty, (2) a data rate supports 1 Mbps, (3) topology has a scatternet structure, (4) latency is 3 ms, (5) a maximum current is 15 mA or lower, (6) output power is 10 mW (10 dBm) or less, and (7) the BLE technology is commonly used in applications such as a clock, sports, healthcare, sensors, device control, and the like.

The server device 120 may operate as a client device in a relationship with other device, and the client device may operate as a server device in a relationship with other device. That is, in the BLE communication system, any one device may operate as a server device or a client device, or may operate as both a server device and a client device if necessary.

The server device 120 may be expressed as a data service device, a slave device, a slave, a server, a conductor, a host device, a gateway, a sensing device, a monitoring device, a first device, a second device, etc.

The client device 110 may be expressed as a master device, a master, a client, a member, a sensor device, a sink device, a collector, a third device, a fourth device, etc.

The server device and the client device correspond to main components of the wireless communication system and the wireless communication system may include other components other than the server device and the client device.

The server device refers to a device that receives data from the client device, communicates directly with the client device, and provides data to the client device through a response when receiving a data request from the client device.

Further, the server device sends a notice/notification message and an indication message to the client device in order to provide data information to the client device. In addition, when the server device transmits the indication message to the client device, the server device receives a confirm message corresponding to the indication message from the client device.

Further, the server device may provide the data information to a user through a display unit or receive a request input from the user through a user input interface in the process of transmitting and receiving the notice, indication, and confirm messages to and from the client device.

In addition, the server device may read data from a memory unit or write new data in the corresponding memory unit in the process of transmitting and receiving the message to and from the client device.

Further, one server device may be connected to multiple client devices and may be easily reconnected to the client devices by using bonding information.

The client device 120 refers to a device that requests the data information or data transmission to the server device.

The client device receives the data from the server device through the notice message, the indication message, etc., and when receiving the indication message from the server device, the client device sends the confirm message in response to the indication message.

Similarly, the client device may also provide information to the user through the display unit or receive an input from the user through the user input interface in the process of transmitting and receiving the messages to and from the server device.

In addition, the client device may read data from the memory unit or write new data in the corresponding memory unit in the process of transmitting and receiving the message to and from the server device.

Hardware components such as the display unit, the user input interface, and the memory unit of the server device and the client device will be described in detail in FIG. 2.

Further, the wireless communication system may configure personal area networking (PAN) through Bluetooth technology. As an example, in the wireless communication system, a private piconet between the devices is established to rapidly and safely exchange files, documents, and the like.

Figure 2:
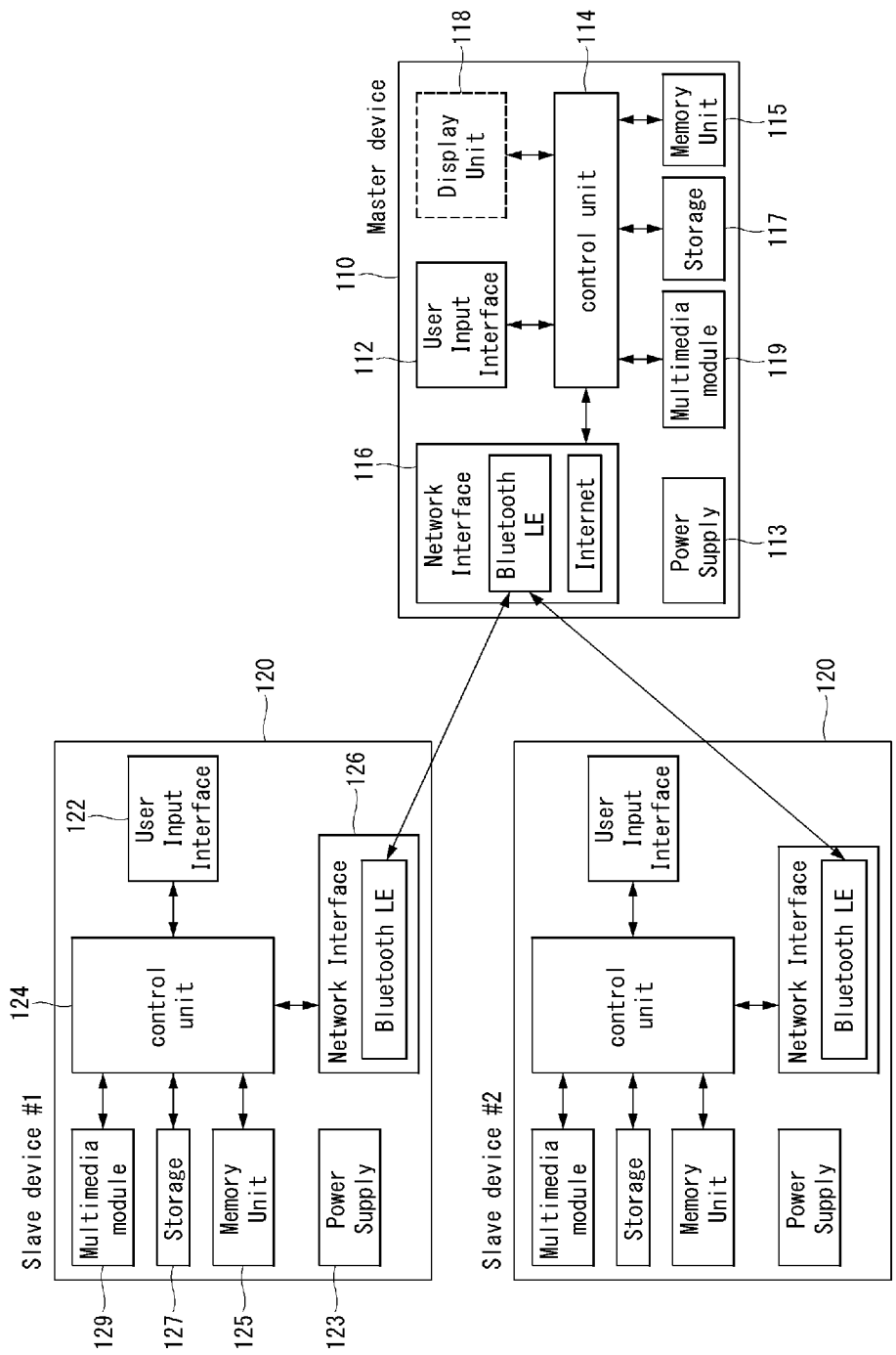
FIG. 2 shows an example of an internal block diagram of a device capable of implementing methods proposed in the present disclosure.

FIG. 2 shows an example of an internal block diagram of a device capable of implementing methods proposed in the present disclosure.

As shown in FIG. 2, a master device 110 includes an input unit (user input interface) 112, a power supply unit 113, a control unit 114, a memory unit 115, a network interface 116 including a Bluetooth interface, a storage 117, an output unit (display unit) 118, and a multi media module 119.

The input unit (user input interface) 112, the power supply unit 113, the control unit 114, the memory unit 115, the network interface 116 including the Bluetooth interface, the storage 117, the output unit (display unit) 118, and the multi media module 119 are functionally connected to each other to perform the method proposed in the present disclosure.

In addition, as shown in FIG. 2, slave devices (#1 and #2) 120 include an input unit (user input interface) 122, a power supply unit 123, a control unit 124, a memory unit 125, a network interface 126 including a Bluetooth interface, a storage 127, an output unit (display unit) 128, a multi media module 129.

The input unit (user input interface) 122, the power supply unit 123, the control unit 124, the memory unit 125, the network interface 126 including the Bluetooth interface, the storage 127, the output unit (display unit) 128, the multi media module 129 are functionally connected to each other to perform the method proposed in the present disclosure.

The Bluetooth interface 116, 126 refers to a unit (or module) capable of transmitting a request/response, command, notification, indication/confirm message, or data between devices using the Bluetooth technology.

The memory 115, 125 is implemented in various types of devices and refers to a unit in which various data is stored. Also, the storages 117 and 127 refer to units that perform a function similar to that of a memory.

The processor 114, 124 refers to a module for controlling an overall operation of the master device 110 or the slave device 120, and controls the server device or the client device in order in order to request the transmission of a message through the Bluetooth interface or other interface and to process a received message.

The processors 114 and 124 may include an application-specific integrated circuit (ASIC), another chipset, a logic circuit, and/or a data processing device.

The memory units 115 and 125 may include a read-only memory (ROM), a random access memory (RAM), a flash memory, a memory card, a storage medium, and/or other storage devices.

The memories 115 and 125 may be internal or external to the processors 114 and 124, and may be connected to the processors 114 and 124 by various well-known means.

The output units 118 and 128 refer to modules for providing device state information and message exchange information to the user through a screen.

The power supply units 113 and 123 refer to modules that receive external power and internal power under the control of the control unit and supply power required for operating each of the components.

As described above, the BLE technology may have a small duty cycle and significantly reduce power consumption through low data rate.

Figure 3:
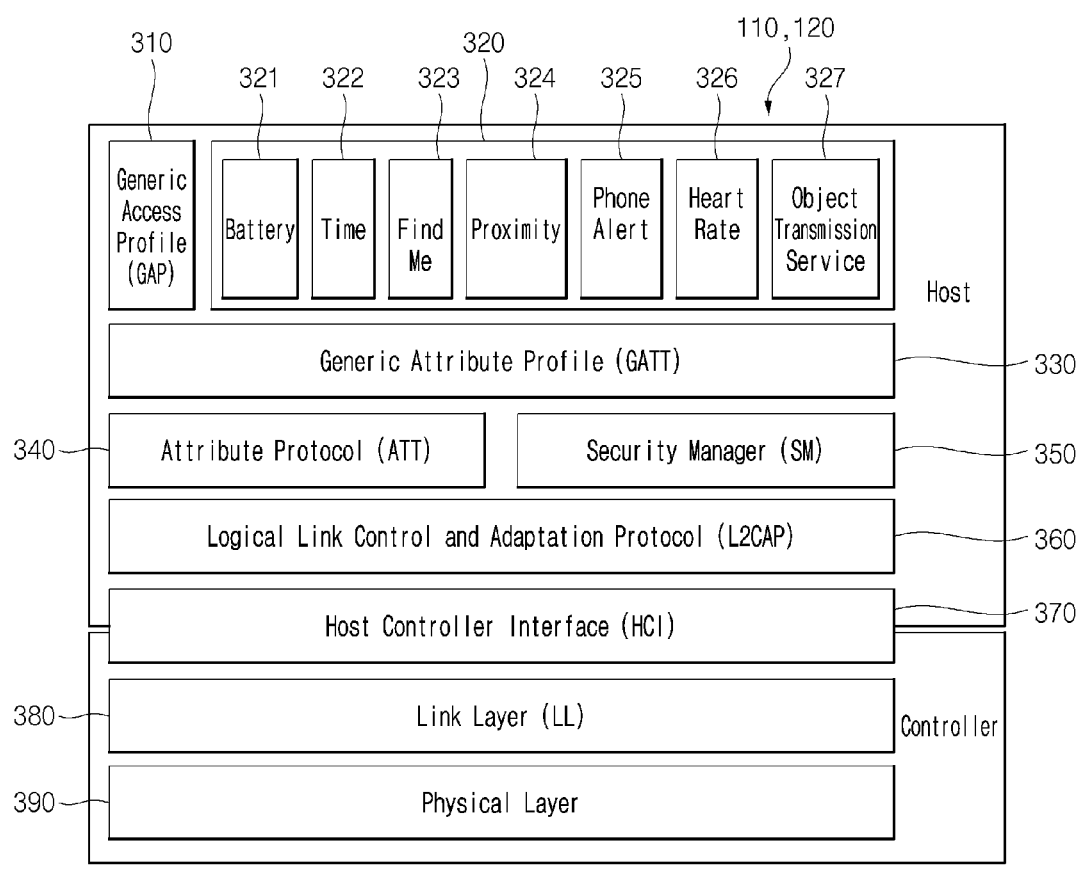
FIG. 3 illustrates an example of a Bluetooth communication architecture to which methods proposed by the present disclosure may be applied.

FIG. 3 illustrates an example of a Bluetooth communication architecture to which methods proposed by the present disclosure may be applied.

Specifically, FIG. 3 illustrates an example of an architecture of Bluetooth low energy (LE).

As shown in FIG. 3, the BLE structure includes a controller stack capable of processing a wireless device interface for which timing is critical and a host stack capable of processing high level data.

The controller stack may also be called a controller. In order to avoid confusion with the processor, that is, an internal element of the device described with reference to FIG. 2, however, the controller stack may be preferably used below.

First, the controller stack may be implemented using a communication module which may include a Bluetooth wireless device and a processor module which may include a processing device, such as a microprocessor.

The host stack may be implemented as part of an OS operating on the processor module or as a package instance on an OS.

In some cases, the controller stack and the host stack may operate or may be performed on the same processing device within the processor module.

The host stack includes a generic access profile (GAP) 310, GATT based profiles 320, a generic attribute profile (GATT) 330, an attribute protocol (ATT) 340, a security manager (SM) 350, and a logical link control and adaptation protocol (L2CAP) 360. The host stack is not limited to the aforementioned composition, but may include various protocols and profiles.

The host stack multiplexes various protocols and profiles provided by that Bluetooth disclosure using the L2CAP.

First, the L2CAP 360 provides one bilateral channel for sending data to according to a specific protocol or specific profile.

The L2CAP is capable of multiplexing data between upper layer protocols, segmenting or reassembling packages, and managing multicast data transmission.

BLE uses three fixed channels for respective signaling, a security manager, and an attribute protocol.

BR/EDR uses a dynamic channel and supports a protocol service multiplexer, retransmission, streaming mode.

The SM 350 authenticates a device, which is a protocol for providing a key distribution.

The ATT 340 relies on a server-client structure, which defines rules for a corresponding device for data access. Six message types are defined: Request, Response, Command, Notification, Indication, and Confirmation.

① Request and Response message: the Request message is used when a client device requests specific information from a server device, and the Response message is used in response to a Request message, which is transmitted from the server device to the client device.

② Command message: The Command message is transmitted from a client device to a server device in order to indicate a command for a specific operation, but the server device does not send a response to a Command message to the client device.

③ Notification message: A server device sends this message to a client device in order to provide notification of an event, but the client device does not send a confirmation message to the server device in response to a Notification message.

④ Indication and Confirm message: A server device sends this message to a client device in order to provide notification of an event. Unlike in the Notification message, the client device sends a Confirm message to the server device in response to an Indication message.

The generic access profile (GAP) is a layer newly implemented to support the BLE technology, and is used to control the selection of a role for communication between BLE devices and a multi-profile operation.

The GAP is mainly used for device discovery, connection establishment, and security. That is, the GAP defines a method for providing information to a user and also defines the following attribute types.

① Service: A combination of actions related to data, and it defines the basic operation of a device.

② Include: Define a relationship between services.

③ Characteristics: A data value used by a service.

④ Behavior: A format that may be readable by a computer, which is defined by a Universal Unique Identifier (UUID) and a value type.

The GATT-based profiles are dependent on the GATT and are mainly applied to BLE devices. The GATT-based profiles may include Battery, Time, FindMe, Proximity, Object Delivery Service and so on. More specific descriptions of the GATT-based profiles are as follows.

Battery: A method for exchanging battery information.
Time: A method for exchanging time information.
FindMe: A method for providing an alarm service according to the distance.
Proximity A method for exchanging battery information.
Time: A method for exchanging time information The GATT may be used as a protocol by which to describe how the ATT is utilized at the time of composing services. For example, the GATT may be used to define how the ATT profiles are grouped together with services and to describe characteristics associated with the services.

Therefore, the GATT and the ATT describe device statuses and services, and how features are associated with each other and how they are used.

The controller stack includes a physical layer 390, a link layer 380, and a host controller interface 370.

The physical layer 390 (or a wireless transmission and reception module) sends and receives radio signals of 2.4 GHz, and uses GFSK modulation and frequency hopping utilizing 40 RF channels.

The link layer 380 sends or receives Bluetooth packets.

Furthermore, the link layer establishes a connection between devices after performing the advertising and scanning function using three advertising channels, and provides a function of exchanging a maximum of 42 bytes of data packets through 37 data channels.

The host controller interface (HCI) provides an interface between the host stack and the controller stack so that the host stack may provide commands and data to the controller stack and the controller stack may provide events and data to the host stack.

Hereinafter, the procedure of BLE is described briefly.

The BLE procedure includes a device filtering procedure, an advertising procedure, a scanning procedure, a discovering procedure, and a connecting procedure.

Device Filtering Procedure

The device filtering procedure functions to reduce the number of devices which perform responses to requests, commands, or notification in the controller stack.

All of devices may not need to respond to received requests. Accordingly, the controller stack reduces the number of transmitted requests so that power consumption may be reduced in the BLE controller stack.

An advertising device or a scanning device may perform the device filtering procedure in order to restrict the number of devices which receive advertisement packets, scan requests, or connection requests.

In this case, the advertising device refers to a device which sends an advertisement event, that is, a device which performs advertisement, and is also called an advertiser.

A scanning device refers to a device which performs scanning, that is, a device which sends a scan request.

In the BLE disclosure, if a scanning device receives part of advertisement packets from an advertising device, the scanning device has to send a scan request to the advertising device.

If the transmission of a scan request is not required as the device filtering procedure is used, however, the scanning device may ignore advertisement packets transmitted by an advertising device.

The device filtering procedure may be used even in the connection request procedure. If device filtering is used for the connection request procedure, the need for sending a response to a connection request may be made unnecessary by ignoring the connection request.

Advertising Procedure

An advertising device performs an advertisement procedure to perform non-directional broadcast using the devices within the range of the advertising device.

In this case, the non-directional broadcast refers to broadcast in all directions rather than broadcast in specific directions.

Unlike the non-directional broadcast, the directional broadcast refers to broadcast in a specific direction. Non-directional broadcast is performed without involving a connection procedure between devices in a listening state (hereinafter referred to as a "listening device").

The advertising procedure is used to establish a BLE to a nearby initiating device.

In some embodiments, the advertising procedure may be used to provide the periodic broadcast of user data to scanning devices which perform listening through an advertising channel.

In the advertising procedure, all of advertisements (or advertisement events) are broadcasted through an advertising physical channel.

An advertising device may receive a scan request from a listening device which performs a listening operation in order to obtain additional user data from the advertising device. In response to the scan request, the advertising device sends a response to the listening device which has sent the scan request through the same advertising physical channel through which the advertising device has received the scan request.

While broadcast user data sent as part of advertising packets forms dynamic data, scan response data is static for the most part.

An advertising device may receive a connection request from an initiating device through an advertising (or broadcast) physical channel. If the advertising device has used a connectable advertisement event and the initiating device has not been filtered by a filtering procedure, the advertising device stops an advertisement and enters connected mode. The advertising device may resume the advertisement after entering the connected mode.

Scanning Procedure

A device performing a scan operation, that is, a scanning device, performs a scanning procedure in order to listen to the non-directional broadcast of user data from advertising devices which use an advertising physical channel.

In order to request additional user data, a scanning device sends a scan request to an advertising device through an advertising physical channel. In response to the scan request, the advertising device includes additional user data requested by the scanning device in a scan response and sends the scan response to the scanning device through the advertising physical channel.

The scanning procedure may be used while a scanning device is connected to another BLE device in a BLE piconet.

If a scanning device receives a broadcast advertising event and stays in initiator mode where a connection request may be initiated, the scanning device may initiate BLE for an advertising device by sending a connection request to the advertising device through an advertising physical channel.

If a scanning device sends a connection request to an advertising device, the scanning device stops the entire scanning for additional broadcast and enters connected mode.

Discovering Procedure

Devices capable of Bluetooth communication (hereinafter referred to as "Bluetooth devices") perform an advertising procedure and a scanning procedure in order to discover devices around the Bluetooth devices or devices to be discovered by other devices within a given area.

The discovering procedure is performed in an asymmetric manner A Bluetooth device searching for another Bluetooth device nearby is called a discovering device, and performs listening in order to search for devices that advertise advertisement events that may be scanned. A Bluetooth device which may be discovered and used by another device is called a discoverable device. A discoverable device actively broadcasts an advertisement event so that other devices may scan the discoverable device through an advertising (or broadcast) physical channel.

Both of the discovering device and the discoverable device may already have been connected to other Bluetooth devices in a piconet.

Connecting Procedure

A connecting procedure is asymmetric. In the connecting procedure, while a particular Bluetooth device performs an advertising procedure, other Bluetooth devices need to perform a scanning procedure.

In other words, the advertising procedure may be a primary task to be performed, and as a result, only one device may respond to an advertisement. After receiving a connectable advertisement event from an advertising device, the connecting procedure may be initiated by sending a connection request to the advertising device through an advertising (or broadcast) physical channel.

Operation statuses defined in the BLE technology, that is, an advertising state, a scanning state, an initiating state, and a connection state, are described briefly below.

Advertising State

The link layer (LL) enters the advertising state in a command from a host (or stack). If the link layer is in the advertising state, the link layer sends advertising packet data units (PDUs) at advertisement events.

Each advertisement event includes at least one advertising PDU, and the advertising PDU is transmitted through an advertising channel index. Each advertisement event may be previously closed if the advertising PDU is transmitted through each advertising channel index, the advertising PDU is terminated, or the advertising device needs to secure the space in order to perform other functions.

Scanning State

The link layer enters the scanning state in response to a command from a host (or stack). In the scanning state, the link layer listens to advertising channel indices.

The scanning state supports two types: passive and active scanning. The host determines a scanning type.

No separate time or advertising channel index is defined to perform scanning.

In the scanning state, the link layer listens to an advertising channel index for "scanWindow" duration. scanInterval is defined as the interval between the start points of two consecutive scan windows.

If there is no scheduling collision, the link layer has to perform listening in order to complete all of the scanIntervals of scanWindows as commanded by the host. In each scanWindow, the link layer has to scan other advertising channel indices. The link layer uses all of available advertising channel indices.

In the case of passive scanning, the link layer is unable to send any packet, but only receives packets.

In the case of active scanning, the link layer performs listening to the advertising device to rely on the advertising PDU type by which additional information related to the advertising PDUs and advertising device may be requested.

Initiating State

The link layer enters the initiating state in response to a command from a host (or stack).

In the initiating state, the link layer performs listening to advertising channel indices.

In the initiating state, the link layer listens to an advertising channel index for "scanWindow" duration.

Connection State

The link layer enters a connection state when the device performing the connection request, i. E., the initiating device transmits CONNECT_REQ PDU to the advertising device or when the advertising device receives CONNECT_REQ PDU from the initiating device.

After entering the connections state, it is considered that the connection is created. However, it need not be considered so that the connection is established at the time of entering the connections state. An only difference between a newly created connection and the previously established connection is a link layer connection supervision timeout value.

When two devices are connected to each other, two devices play difference roles.

A link layer serving as a master is referred to as the master and a link layer serving as a slave is referred to as the slave. The master controls a timing of a connection event and the connection event refers to a time at which the master and the slave are synchronized.

Hereinafter, a packet defined the Bluetooth interface will be briefly described. BLE devices use packets defined below.

Packet Format

The link layer has only one packet format used for both an advertising channel packet and a data channel packet.

Each packet is constituted by four fields, i.e., a preamble, an access address, a PDU, and a CRC.

When one packet is transmitted in an advertising physical channel, the PDU will become an advertising channel PDU and when one packet is transmitted in a data physical channel, the PDU will become a data channel PDU.

Advertising Channel PDU

The advertising channel PDU includes a 16 bit header and a payload of various sizes.

The PDU type field of an advertising channel included in the header supports PDU types defined in Table 1 below.

TABLE 1

| PDU Type | PDU Name | Channel | Permitted PHYs LE 1M | LE 2M | LE Coded |
|---|---|---|---|---|---|
| 0000b | ADV_IND | Primary Advertising | ● | | |
| 0001b | ADV_DIRECT_IND | Primary Advertising | ● | | |
| 0010b | ADV_NONCONN_IND | Primary Advertising | ● | | |
| 0011b | SCAN_REQ | Primary Advertising | ● | | |
| | AUX_SCAN_REQ | Secondary Advertising | ● | ● | ● |
| 0100b | SCAN_RSP | Primary Advertising | ● | | |
| 0101b | CONNECT_IND | Primary Advertising | ● | | |
| | AUX_CONNECT_REQ | Secondary Advertising | ● | ● | ● |
| 0110b | ADV_SCAN_IND | Primary Advertising | ● | | |

Advertising PDU

The following advertising channel PDU types are called advertising PDUs and are used for specific events.

ADV_IND: a connectable non-directional advertisement event

ADV_DIREC_IND: a connectable directional advertisement event

ADV_NONCONN_IND: a non-connectable non-directional advertisement event

ADV_SCAN_IND: a non-directional advertisement event that may be scanned

The PDUs are transmitted by the link layer in the advertising state and are received by the link layer in the scanning state or initiating state.

Scanning PDUs

The advertising channel PDU type below is called a scanning PDU and is used in the status described below.

SCAN_REQ: transmitted by the link layer in the scanning state and received by the link layer in the advertising state.

SCAN_RSP: transmitted by the link layer in the advertising state and received by the link layer in the scanning state.

Initiating PDUs

The advertising channel PDU type below is called an initiating PDU.

CONNECT_REQ: transmitted by the link layer in the initiating state and received by the link layer in the advertising state.

Data Channel PDU

The data channel PDU may have a 16-bit header and various sizes of payloads and include a message integrity check (MIC) field.

The procedure, the state, the packet format, and the like in the BLE technology, which are described above, may be applied in order to perform methods proposed by the present disclosure.

Figure 4:
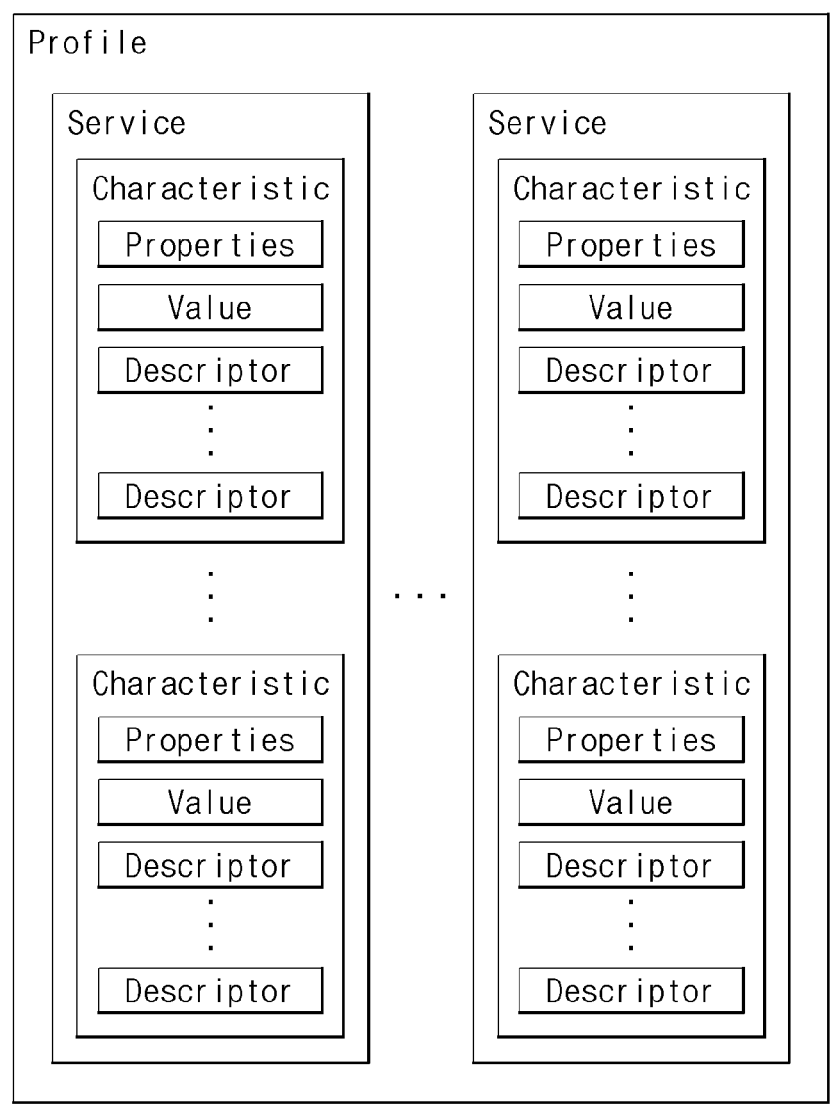
FIG. 4 illustrates an example of a structure of a generic attribute profile (GATT) of Bluetooth low energy.

FIG. 4 illustrates an example of a structure of a generic attribute profile (GATT) of Bluetooth low energy.

Referring to FIG. 4, a structure for exchanging profile data of the Bluetooth low energy may be described.

Specifically, the generic attribute profile (GATT) is a definition of a method in which data is transmitted and received by using services and characteristics between the Bluetooth LE devices.

In general, a Peripheral device (e.g., a sensor device) serves as a GATT server and has a definition of services and characteristics.

A GATT client sends a data request to the GATT server in order to read or write the data and all transactions start at the GATT client and the response is received from the GATT server.

Figure 5:
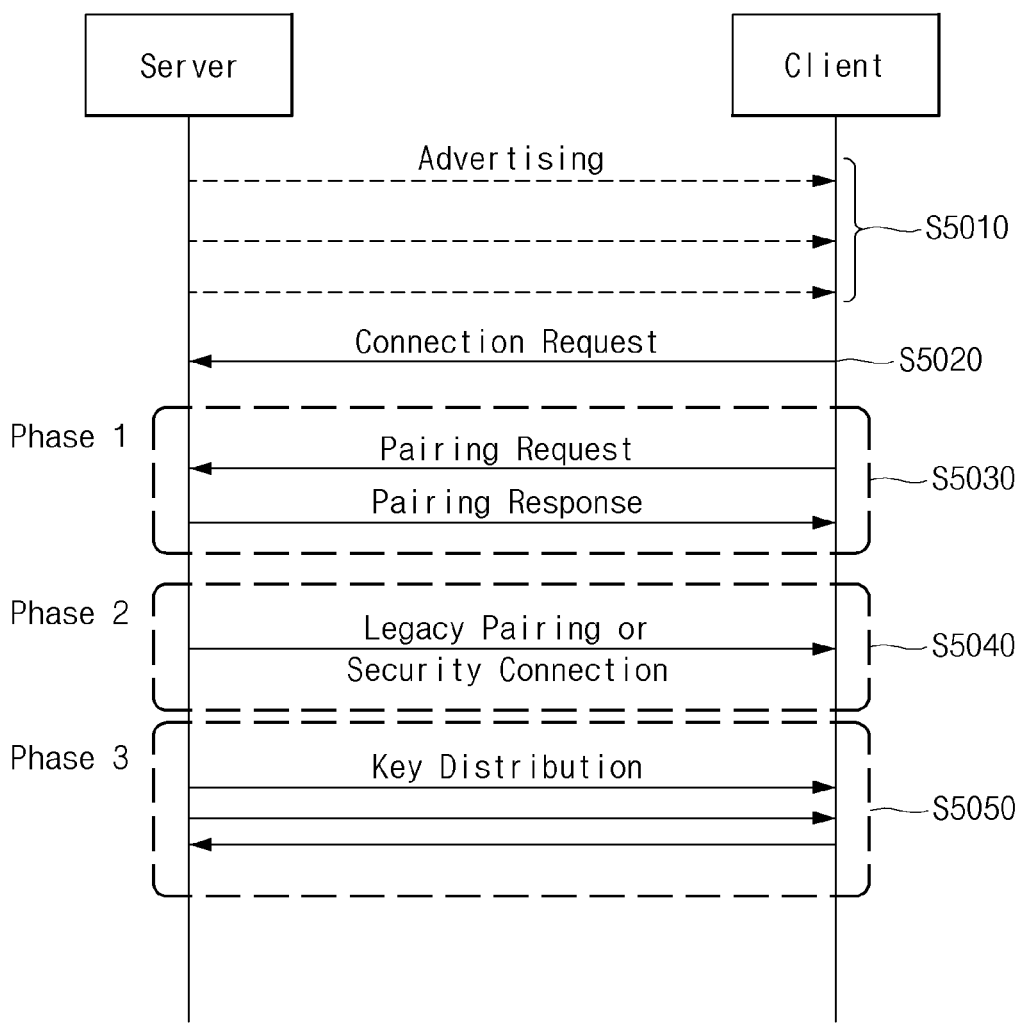
FIG. 5 is a flowchart showing an example of a connection procedure method in Bluetooth low power energy technology to which various embodiments of the present disclosure may be applied.

A GATT-based operation structure used in the Bluetooth LE may be based on THE profile, the service, and the characteristic, and may have a vertical structure illustrated in FIG. 5.

The profile may be constituted by one or more services and the service may be constituted by one or more characteristics or other services.

The service may serve to divide data into logical units and include one or more characteristics or other services. Each service has a 16-bit or 128-bit separator called a Universal Unique Identifier (UUID).

The characteristic is a lowest unit in the GATT-based operation structure. The characteristic includes only one datum and has a 16-bit or 128-bit UUID similar to the service.

The characteristic is defined as a value of various information and requires one attribute to contain each information. The characteristic may adopt various consecutive attributes.

The attribute is constituted by four components, which have the following meanings.

handle: Address of attribute
Type: Type of attribute
Value: Value of attribute
Permission: Access authority to attribute FIG. 5 is a flowchart showing an example of a connection procedure method in Bluetooth low power energy technology to which the present disclosure may be applied.

A server transmits to a client an advertisement message through three advertising channels (S5010).

The server may be called an advertiser before connection and called as a master after the connection. As an example of the server, there may be a sensor (temperature sensor, etc.).

Further, the server may be called a scanner before the connection and called as a slave after the connection. As an example of the client, there may be a smartphone, etc.

As described above, in Bluetooth, communication is performed over a total of 40 channels through the 2.4 GHz band. Three channels among 40 channels as the advertising channels are used for exchanging sent and received for establishing the connection, which include various The remaining 37 channels are used for data exchange after connection to the data channel.

The client may receive the advertisement message and thereafter, transmit the Scan Request message to the server in order to obtain additional data (e.g., a server device name, etc.).

In this case, the server transmits the Scan Response message including the additional data to the client in response to the Scan Request message.

Here, the Scan Request message and the Scan Response message are one type of advertising packet and the advertising packet may include only user data of 31 bytes or less.

Therefore, when there is data in which the size of the data is larger than 3 bytes, but overhead to transmit the data through the connection, the data is divided and sent twice by using the Scan Request message and the Scan Response message.

Next, the client transmits to the server a Connection Request message for establishing a Bluetooth connection with the server (S5020).

Therefore, a Link Layer (LL) connection is established between the server and the client.

Thereafter, the server and the client perform a security establishment procedure.

The security establishment procedure may be interpreted as security simple pairing or may be performed including the same.

That is, the security establishment procedure may be performed through Phase 1 through Phase 3.

Specifically, a pairing procedure (Phase 1) is performed between the server and the client (S5030).

In the pairing procedure, the client transmits a Pairing Request message to the server and the server transmits a Pairing Response message to the client.

Through the pairing procedure, authentication requirements and input (I)/output (O) capabilities and Key Size information are sent and received between the devices. Through the information, which key generation method is to be used in Phase 2 is determined.

Next, as Phase 2, legacy pairing or secure connections are performed between the server and the client (S5040).

In Phase 2, A 128-bit temporary key and a 128-bit short term key (STK) for performing the legacy pairing are generated.

Temporary Key: Key made for creating the STK
Short Term Key (LTK): Key value used for making encrypted connection between devices When the secure connection is performed in Phase 2, a 128-bit long term key (LTK) is generated.

Long Term Key (LTK): Key value used even in later connection in addition to encrypted connection between the devices Next, as Phase 3, a Key Distribution procedure is performed between the server and the client (S5050).

Therefore, the secure connection may be established and the data may be transmitted and received by forming the encrypted link.

Isochronous Channel General

In the case of an audio signal, it can be seen that audio streaming data or audio data occurs periodically at an idle event interval.

The audio data occurs periodically (or at specific time intervals) according to its characteristics. Here, a specific time period in which audio data periodically occurs may be expressed as the idle event interval. In each Idle Event Interval, each audio data is transported. In addition, each audio data may be transported through all or part of the Idle Event Interval. When transporting audio streaming data occurring periodically or regularly using the BLE mechanism, advertising and scanning procedures, communication procedures, disconnection procedures, etc. must be performed whenever the occurred audio data is transmitted and received. However, audio data generally occurs periodically, and a latency guarantee for audio data transport is essential regardless of the amount of data.

However, when advertising and scanning procedures, communication procedures, disconnection procedures, etc. must be performed whenever newly occurred audio data is transported, there is a problem in that latency occurs in audio data transport.

The transport of audio data through hearing aids (HA) or headsets can obtain higher energy efficiency when using BLE technology than Bluetooth BR/EDR technology because of the relatively small amount of data, however, as seen above, because advertising and connection, etc. must be performed for each data transport, the Data Channel Process of BLE technology has a large overhead in data transport, and in particular, cannot guarantee Latency Guarantee, which is absolutely necessary for audio data transport.

In addition, since the Data Channel Process of BLE technology aims to transport data occurred in a single only when necessary and in other time domains, and since it aims to increase energy efficiency by inducing Deep Sleep of BLE devices, it can be difficult to apply the Data Channel Process of BLE technology to the transport of periodically occurring audio data.

Definition of Isochronous Channels and Related Mechanisms

A new channel, that is, an isochronous channel, is defined to transport data occurring periodically using BLE technology.

The isochronous channel is a channel used to transport isochronous data between devices (e.g. Conductor-Member) using an isochronous stream.

The isochronous data refers to data that is periodically or regularly transported at specific time intervals.

That is, the isochronous channel may represent a channel through which periodically occurring data such as audio data or voice data is transmitted and received in the BLE technology. Also, the isochronous channel may represent a channel through which data generated based on a user input of a controller device of a game user is transmitted and received in a gaming scenario. The isochronous channel may be used to transmit and receive data with a single member, a set of one or more coordinated members, or multiple members. In addition, the isochronous channel corresponds to a flushing channel that can be used to transmit and receive an isochronous stream such as audio streaming or important data in another time domain.

Configuration of Various Embodiments of the Present Disclosure

Background for various embodiments of the present disclosure is as follows.

(1) WG initially did not include any "Justification of choice" in the DIPD (1-1) Only one proposal fulfilled the requirements for latency and reliability (WG opinion)

(2) Realized during the WG review that more detail is needed in the DIPD (2-1) Break down design into several areas, each with multiple proposals (3) Creating this "0.4" to facilitate discussion of the proposals and enable new proposals from members that were not present in during the creation of the initial DIPD)

Proposals according to various embodiments of the present disclosure are as follows.

(1) Transport (5 proposals)
(1-1) ISOCH (CIS or BIS)
(1-2) LE ACL
(1-3) LE Advertising
(1-4) BR/EDR
(2) Reliability/Robustness (4 proposals)
(2-1) "Unreliable": No retransmit, no ack
(2-2) Robustness added by limited number of retransmits
(2-3) Robustness added by redundancy
(2-4) "Reliable": like HOGP 1.0
(3) Operation mode (2 proposals)
(3-1) Static Mode (Always "gaming mode" if supported by both devices)
(3-1-1) When both HID Device and HID Host support ULL, ULL is always enabled for selected reports
(3-2) Dynamic Mode ("Gaming mode" or "Office Mode" selected by central device)
(3-2-1) HID Host can switch between low latency and high reliability on application request
(3-2-1-1) HID Host may switch between low latency and high reliability on HID Device request
(3-2-2) Report interval can change on an active HID device
(4) ULL report granularity—which reports to send over ULL (4 proposals)
(4-1) All reports
(4-2) All reports of a given type (input/output/feature)
(4-3) All reports with a given report ID
(4-4) All reports on an interrupt endpoint
(5) How to handle packet loss for different report types
(5-1) Reports with complete state in each report (example: Game controller) (1 proposal)
(5-1-1) 1: HID Host can duplicate "last packet" when a packet is lost
(5-1-1-1) No significant loss of fidelity
(5-2) Reports with delta position (example mouse) (5 proposals)
(5-2-1) 1: HID Host can ignore dropped packets
(5-2-1-1) Loss of fidelity, but not an issue for gaming (?)
(5-2-2) 2: HID Host can extrapolate the position based on maintaining speed and acceleration vectors
(5-2-2-1) Minimal loss of fidelity with high report rate
(5-2-2-2) Adding to complexity. HID Host need to parse reports OR specification defines report "repair descriptors" (basically identifying which octets contain delta coordinates)
(5-2-3) 3: Application (game) can interpolate
(5-2-3-1) Unknown how the game can identify lost packet?
(5-2-3-2) Simple to implement
(5-2-4) 4: HID device integrates movements and send absolute coordinates over the air, HID Host converts to delta
(5-2-4-1) No integrated loss of fidelity (mouse can do "perfect" circles)
(5-2-4-2) Also requires HID host to understand which part(s) of the report to modify
(5-2-5) 5: "FEC"
(5-3) Reports that are sent only on state change (example keyboard) (3 proposals)
(5-3-1) 1: HID Host can ignore dropped packets
(5-3-2) 2: HID Devices send state over the air at every event, HID Host send only changes upstream
(5-3-3) 3: HID Device will continue to send key array until it's ack'ed or no key pressed anymore Selection criteria according to various embodiments of the present disclosure are as follows.

(1) Backwards compatibility
(1-1) An absolute requirement for any profile enhancement.
(1-2) ALL PROPOSALS solve this with feature bits
(2) Meeting the requirements
(2-1) May have a two-stage approach to meet the primary use cases now, and address the less known use cases in a later version
(3) Specification simplicity
(3-1) Time to market matters, cannot introduce new features that require major core changes
(4) Implementation simplicity
(4-1) Both in device and host
(5) Power consumption
(6) Airtime usage
(7) Controller usage Justification of choice (transport) according to various embodiments of the present disclosure is as follows.

(1) Why was ISOCH (CIS) selected?
(1-1) ISOCH CIS
(1-1-1) No over the air changes to core required to meet the 1 ms requirement (TTM)
(1-1-1-1) Might need to HCI to control sub-interval spacing and/or buffer mode
(1-1-2) No significant gain seen for the primary use cases by adding a new core feature
(1-2) ISOCH BIS
(1-2-1) Not selected because: Core does not have a means for synchronizing two devices and may not allow channel map update
(1-2-2) Shares the properties of CIS, with less air-time and lower power consumption
(1-3) LE ACL
(1-3-1) cannot support intervals below 7.5 ms and there is no flush enabled (user experience)
(1-3-2) Probably not a good candidate even for extensive core changes (1-4) LE Advertising (1-4-1) Cannot support 1 ms over long time (high duty cycle directed can for a limited time)
(1-4-2) Only uses 3 channels (ULL on these would have bad side effects on other BLE use cases)
(1-4-3) No channel map updates
(1-5) BR/EDR
(1-5-1) Can get down to 1.25 ms poll, but unclear if the specs can guarantee this scheduling
(1-5-2) There is a flush mechanism in the baseband, but cannot distinguish between packets that need to be reliable and the flushable
(1-5-3) Higher power, ~2× for HID device Justification of choice (Robustness/Reliability) according to various embodiments of the present disclosure is as follows.
(1) Why was limited number of retransmits selected?
(1-1) For gaming use:
(1-1-1) No retransmit fulfill requirements at very low latency
(1-1-2) Limited retransmit (controlled by HID Host) can have 0 or more retransmit and can thus allow both lowest latency and provide some extra robustness at higher latency
(1-1-2-1) Call 5/25: Make a range 1-2 or 0-2, . . . .
(1-1-3) Stream date have a "use before" tag on it=>Cannot use "reliable" transport
(1-2) For "office" use:
(1-2-1) "Reliable" transport required for the expected user experience
(1-3) Note that the specification need to enable some devices (e.g. keyboards and mice) to be able to switch between "gaming" and "office" reports.

Justification of choice (mode) according to various embodiments of the present disclosure is as follows.
(1) Why was Dynamic mode selected?
(1-1) Most of the time low latency is not required. Many users my never use it and never miss it
(1-2) Low latency (limited reliability) is not applicable for nongaming applications
(1-2-1) Especially for devices like keyboard and mouse they need to perform in both modes
(1-3) Specification and implementation complexity is higher, but only "standard" GATT based protocols needed
(1-4) Static mode
(1-4-1) Simpler to implement, but does not handle devices used both for gaming and "office"
(1-4-2) Could possibly be used in a new profile.
(1-4-2-1) Application would be able to switch profile instead?=>Pushing complexity "somewhere else"

Justification of choice (ULL granularity) according to various embodiments of the present disclosure is as follows.
(1) Why was selection by report ID selected?
(1-1) There are some reports that cannot use an unreliable transport, even for gaming devices
(1-2) Using report ID gives implementer more flexibility and may cover use cases the WG does not see.
(1-2-1) Complexity in specification and implementation will be marginally higher than selection by report type or endpoint.
(2) Any use of Isochronous Channels for the selected reports could still be enabled/disabled (dynamic mode) by the profile.

Justification of choice (how to handle packet loss) according to various embodiments of the present disclosure is as follows.
(1) Why was ignoring lost packets* selected?
(1-1) * Keyboard will be required to send the report on every interval (1-1-1) Host can remove duplicates before sending upstream
(1-2) * Mouse (relative coordinates) will be required to send "old" packets
(1-2-1) Host can send "old" packets upstream in order not to lose movements
(2) This solution is simple
(3) The oversampling of the physical events gives robustness through redundancy
(4) Gaming is tolerant to loss
(5) Nongaming applications can drop "Gaming mode"

The design according to various embodiments of the present disclosure is as follows.
(1) HIDS modifications
(1-1) New optional characteristic(s)
(1-1-1) Expose support for "Gaming Mode"
(1-1-2) GATT based procedure to request "Gaming Mode"
(2) HOGP modifications
(2-1) Procedures for enable/disable "Gaming mode"
(2-2) Procedure to handle request for "Gaming mode"
(2-3) Include some timing diagrams
(2-3-1) ACL and ISO for 1 ms/1.25 ms without overlap?
(2-3-2) For 2-3 ms and low-quality audio?

Concerns raised in the DIPD r02/r03 according to various embodiments of the present disclosure are as follows.
(1) Backwards compatibility
(1-1) Any "legacy" HID Host will not be able to change
(2) USB HID does not have states
(3) TO BE FIXED: Switching focus from Gaming app to an app that expects reliability
(3-1) Expect well behaved apps OR watchdog mechanism or . . . .
(3-2) (should refer to "mode selection")
(4) Controllers cannot do this and xxx
(4-1) They can, but not at 1 ms ISO sub-interval
(5) Wi-Fi coexistence
(5-1) Packet loss is acceptable
(5-2) Central can increase latency and even revert to ACL if packet loss rate is too high.

A dynamic mode switch according to various embodiments of the present disclosure is as follows.
(1) Initial boot-up mode is always Office mode (Reliable GATT)
(1-1) Both Central's and Peripheral's reports are sent through Conventional HOGP
(2) Changing from Office mode (Reliable GATT) to Gaming mode (ULL CIS)
(2-1) After ULL game starts, Both Central and Peripheral can change to Gaming mode
(2-1-1) Note>Game will be full screen, only Game app will consume HID reports. (TV, Game Console)
(2-1-2) Note> If Game app is windowed at PC, Office mode is preferred because HID reports can be shared.
(2-1-3) Central: ULL Gaming HOGP setup by Game UI.
(2-1-4) Peripheral: Gaming Mode Notification initiates Central's ULL Gaming HOGP setup.
(3) Returning from Gaming mode to Office mode
(3-1) During ULL game, Both Central and Peripheral can change modes.
(3-2) When exiting ULL game or context switch (e.g. Alt+Tab in windows), Central should change to Office mode.
(3-3) This spec will not handle abnormal exits (OS crash, App crash, etc).
(4) The following embodiments of FIGS. 6 to 9 show exemplary designs for a dynamic mode switch.

Figure 6:
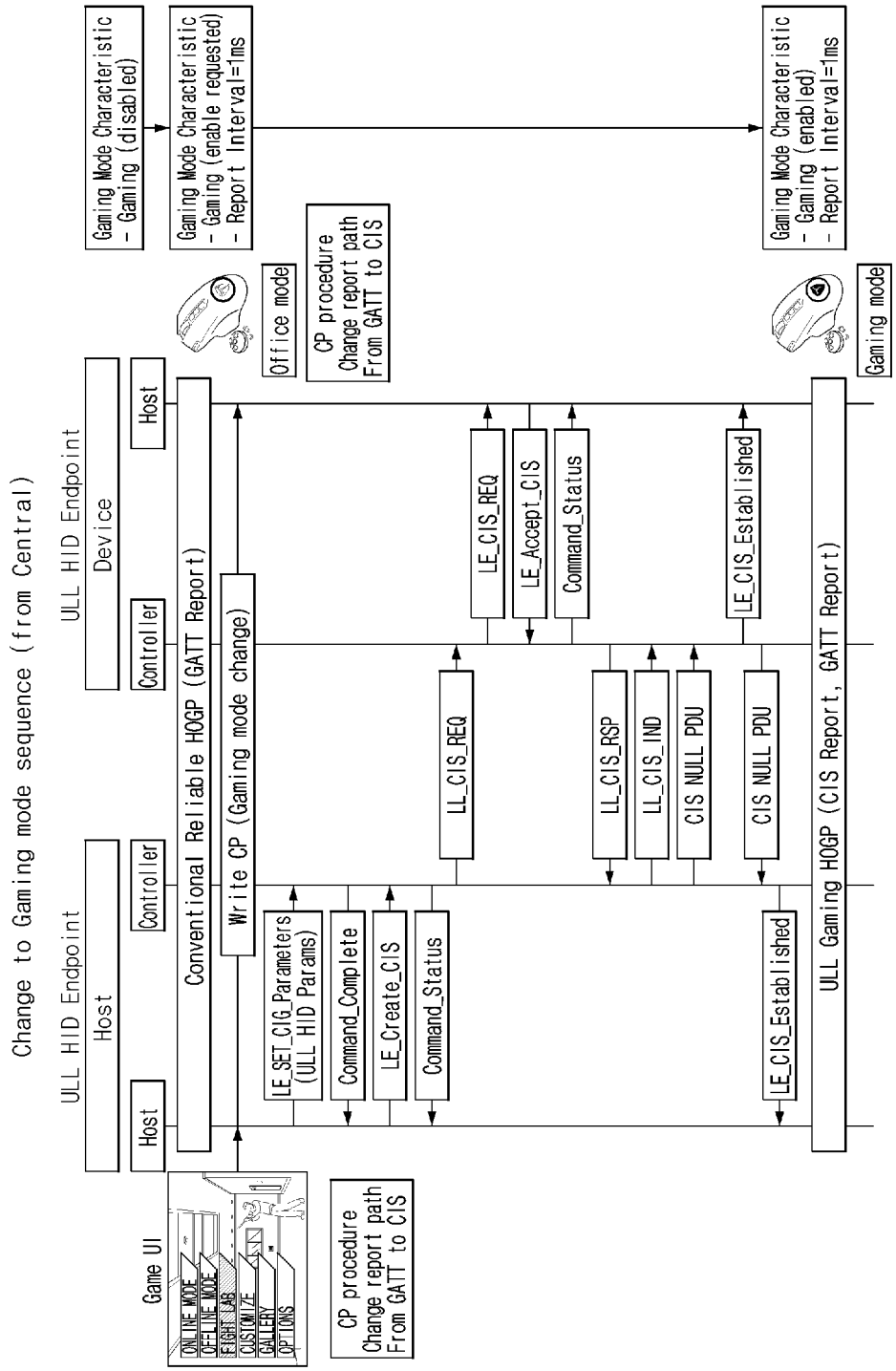
FIG. 6 illustrates an example of a dynamic mode switch in a wireless communication system according to various embodiments of the present disclosure.

FIG. 6 illustrates an example of a dynamic mode switch in a wireless communication system according to various embodiments of the present disclosure.

Specifically, FIG. 6 illustrates a process in which a short-range wireless communication between a central device and a peripheral device (i.e. device) is switched to a gaming mode or a hybrid mode based on a command from the central device (i.e. host device or host).

Referring to FIG. 6, the host device and the peripheral device correspond to ULL HID endpoints.

The host device includes a first processor corresponding to a first host stack; and a second processor corresponding to a first controller stack.

The peripheral device includes a third processor corresponding to a second host stack; and a fourth processor corresponding to a second controller stack.

The host device and the peripheral device perform a short-range wireless communication with each other through communication between the first controller stack and the second controller stack.

The host device and the peripheral device perform communication in a basic mode or an office mode before switching to the gaming mode or the hybrid mode, and are connected through a generic attribute profile (GATT) channel. The host device and the peripheral device share conventional reliable HOGP (GATT Report).

The host device may receive an input for switching to the gaming mode or the hybrid mode through a user interface (UI). For example, while a game application is running in the host device, the host device may receive an input for switching to the gaming mode or the hybrid mode through a game UI. Through this, the CP procedure of the host device performs the operation of change report path from GATT to CIS.

The host device performs Write CP (Gaming mode change).

The peripheral device, which was in the basic mode or the office mode, was in the gaming (disabled) state in relation to a gaming mode characteristic. However, it receives a request for gaming (enable requested), report interval=1 ms in relation to the gaming mode characteristic from the host device.

The CP procedure of the peripheral device performs the operation of change report path from GATT to CIS.

In the host device, the first host stack transmits LE_SET_CIG_Parameters (ULL HID Params) to the first controller stack.

In the host device, the first host stack receives Command_Complete from the first controller stack.

In the host device, the first host stack transmits LE_Create_CIS to the first controller stack.

In the host device, the first host stack receives Command_Status from the first controller stack.

The first controller stack of the host device transmits LL_CIS_REQ to the second controller stack of the peripheral device.

In the peripheral device, the second host stack receives LE_CIS_REQ from the second controller stack.

In the peripheral device, the second host stack transmits LE_Accept_CIS to the second controller stack.

In the peripheral device, the second host stack receives Command_Status from the second controller stack.

The first controller stack of the host device receives LL_CIS_RSP from the second controller stack of the peripheral device.

The first controller stack of the host device transmits LL_CIS_IND to the second controller stack of the peripheral device.

The first controller stack of the host device transmits the CIS NULL PDU to the second controller stack of the peripheral device.

In the peripheral device, the second host stack receives LE_CIS_Established from the second controller stack.

The first controller stack of the host device receives the CIS NULL PDU from the second controller stack of the peripheral device.

In the host device, the first host stack receives LE_CIS_Established from the first controller stack.

The host device and the peripheral device share ULL Gaming HOGP (CIS Report, GATT Report).

The peripheral device switched to the hybrid mode or the gaming mode becomes gaming (enabled), report interval=1 ms in relation to the gaming mode characteristic.

Figure 7:
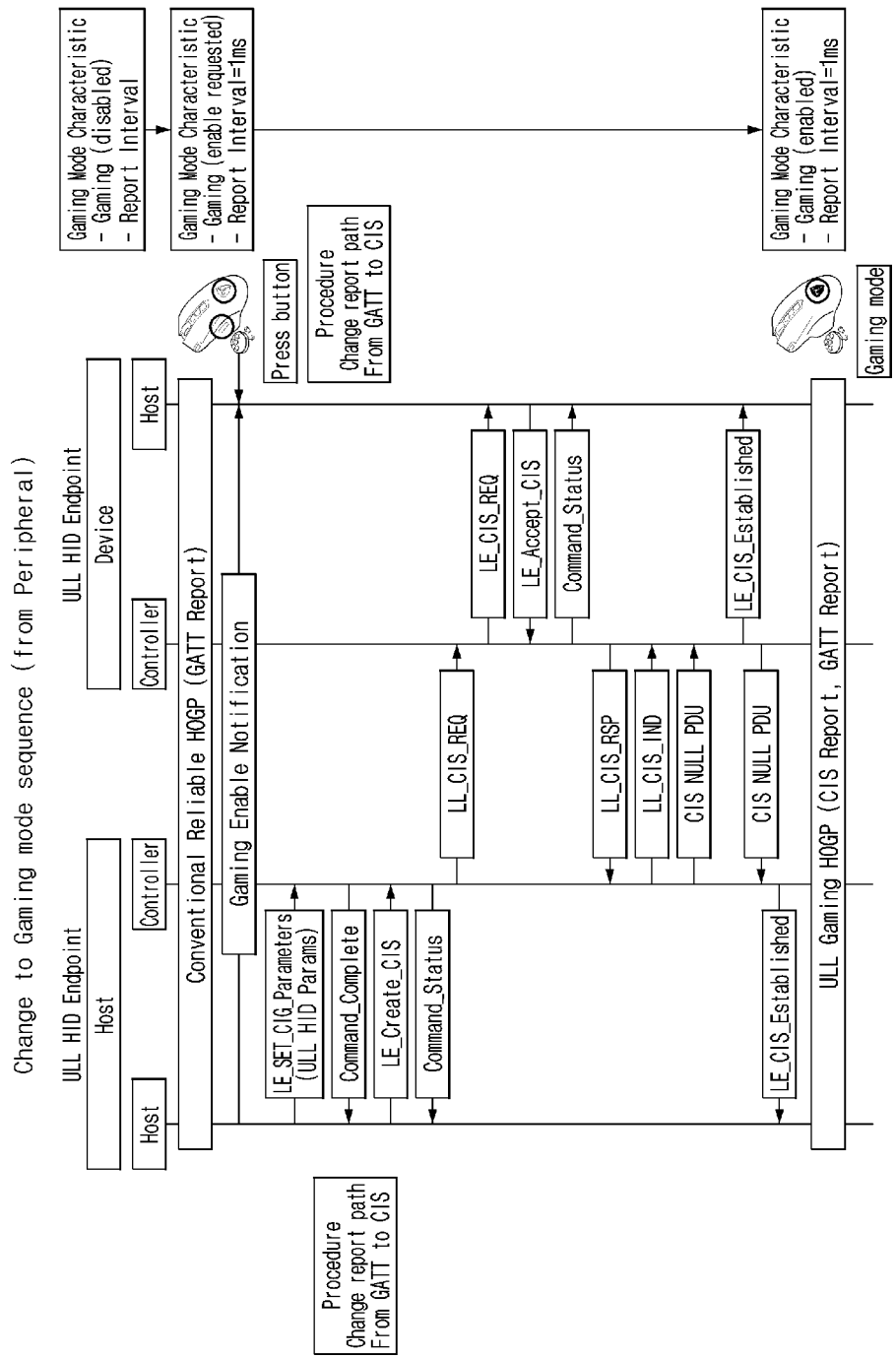
FIG. 7 illustrates an example of a dynamic mode switch in a wireless communication system according to various embodiments of the present disclosure.

FIG. 7 illustrates an example of a dynamic mode switch in a wireless communication system according to various embodiments of the present disclosure.

Specifically, FIG. 7 shows a process in which a short-range wireless communication between a central device (i.e. host device or host) and a peripheral device (i.e. device) is switched to a gaming mode or a hybrid mode based on a command from the peripheral device (i.e. device).

Referring to FIG. 7, the host device and the peripheral device correspond to ULL HID endpoints.

The host device includes a first processor corresponding to a first host stack; and a second processor corresponding to a first controller stack.

The peripheral device includes a third processor corresponding to a second host stack; and a fourth processor corresponding to a second controller stack.

The host device and the peripheral device perform the short-range wireless communication with each other through communication between the first controller stack and the second controller stack.

The host device and the peripheral device perform communication in a basic mode or an office mode before switching to the gaming mode or the hybrid mode, and are connected through a generic attribute profile (GATT) channel. The host device and the peripheral device share conventional reliable HOGP (GATT Report).

The peripheral device may receive an input for switching to the gaming mode or the hybrid mode through an input of pressing a specific button, for example, a specific button of a mouse or a game controller. For example, the host device may receive an input for switching to the gaming mode or the hybrid mode by pressing a specific button on the peripheral device that serves as a game controller while a game application is running Through this, the peripheral device, which was in the basic mode or the office mode, was in the gaming (disabled) state in relation to a gaming mode characteristic. However, the peripheral device receives a request for gaming (enable requested), report interval=1 ms in relation to the gaming mode characteristic by pressing the specific button.

CP procedure of the peripheral device performs the operation of change report path from GATT to CIS.

The host device receives a gaming enable notification from the peripheral device.

In the host device, the first host stack transmits LE_SET_CIG_Parameters (ULL HID Params) to the first controller stack.

In the host device, the first host stack receives Command_Complete from the first controller stack.

In the host device, the first host stack transmits LE_Create_CIS to the first controller stack.

In the host device, the first host stack receives Command_Status from the first controller stack.

The first controller stack of the host device transmits LL_CIS_REQ to the second controller stack of the peripheral device.

In the peripheral device, the second host stack receives LE_CIS_REQ from the second controller stack.

In the peripheral device, the second host stack transmits LE_Accept_CIS to the second controller stack.

In the peripheral device, the second host stack receives Command_Status from the second controller stack.

The first controller stack of the host device receives LL_CIS_RSP from the second controller stack of the peripheral device.

The first controller stack of the host device transmits LL_CIS_IND to the second controller stack of the peripheral device.

The first controller stack of the host device transmits CIS NULL PDU to the second controller stack of the peripheral device.

In the peripheral device, the second host stack receives LE_CIS_Established from the second controller stack.

The first controller stack of the host device receives CIS NULL PDU from the second controller stack of the peripheral device.

In the host device, the first host stack receives LE_CIS_Established from the first controller stack.

The host device and the peripheral device share ULL Gaming HOGP (CIS Report, GATT Report).

The peripheral device switched to the hybrid mode or the gaming mode becomes gaming (enabled), report interval=1 ms in relation to the gaming mode characteristic.

Figure 8:
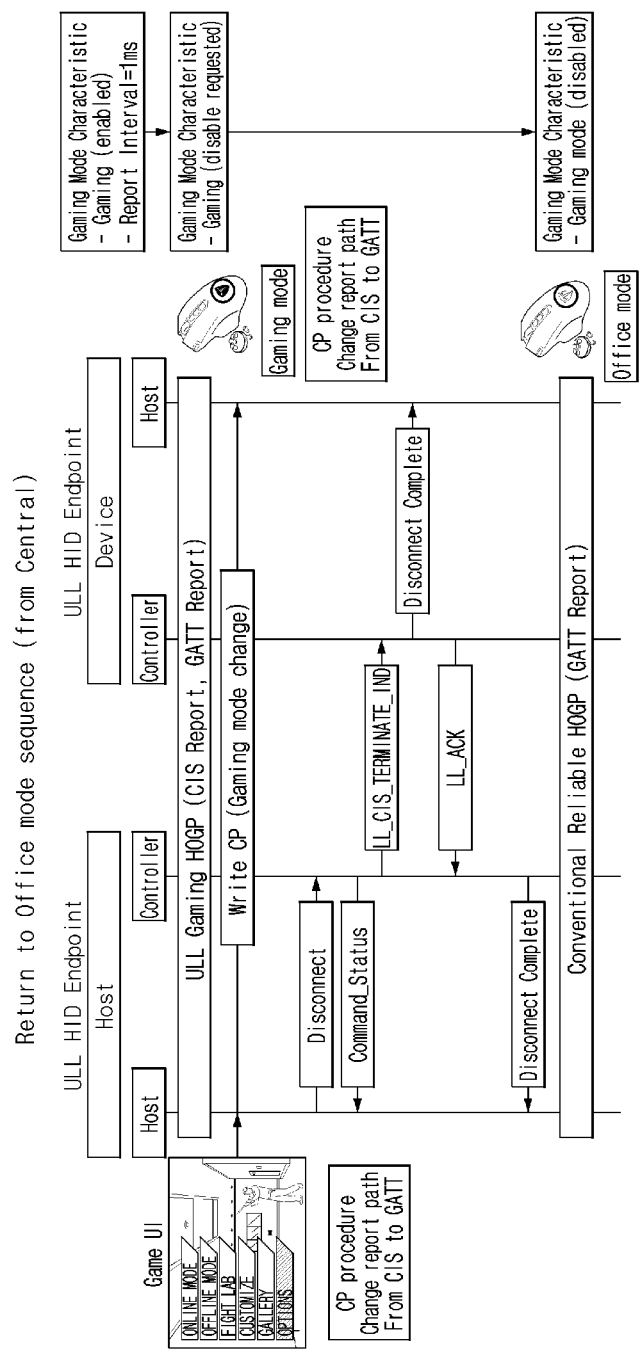
FIG. 8 illustrates an example of a dynamic mode switch in a wireless communication system according to various embodiments of the present disclosure.

FIG. 8 illustrates an example of a dynamic mode switch in a wireless communication system according to various embodiments of the present disclosure.

Specifically, FIG. 8 illustrates a process in which a short-range wireless communication between a central device and a peripheral device (i.e. device) is switched to an office mode or a basic mode based on a command from the central device (i.e. host device or host).

Referring to FIG. 8, a host device and a peripheral device correspond to ULL HID endpoints.

The host device includes a first processor corresponding to a first host stack; and a second processor corresponding to a first controller stack.

The peripheral device includes a third processor corresponding to a second host stack; and a fourth processor corresponding to a second controller stack.

The host device and the peripheral device perform the short-range wireless communication with each other through communication between the first controller stack and the second controller stack.

The host device and the peripheral device perform communication before switching to the office mode or the basic mode, and are connected through a generic attribute profile (GATT) channel and a connected isochronous stream (CIS) channel. The host device and the peripheral device share ULL Gaming HOGP (CIS Report, GATT Report).

The host device may receive an input for switching to the office mode or the basic mode through a user interface (UI). For example, while a game application is running on the host device, the host device may receive an input for switching to the office mode or the basic mode through the game UI. Through this, CP procedure of the host device performs the operation of change report path from CIS to GATT.

The host device performs Write CP (Office mode change).

The peripheral device, which was in a gaming mode or a hybrid mode, was in a state of gaming (enabled), report interval=1 ms in relation to a gaming mode characteristic. However, a request for gaming (disable requested) is received in relation to gaming mode characteristic from the host device.

The CP procedure of the peripheral device performs the operation of change report path from CIS to GATT.

In the host device, the first host stack transmits a disconnect message to the first controller stack.

In the host device, the first host stack receives Command_Status from the first controller stack.

The first controller stack of the host device transmits LL_CIS_TERMINATE_IND to the second controller stack of the peripheral device.

In the peripheral device, the second host stack receives Disconnect Complete from the second controller stack.

The first controller stack of the host device receives LL_ACK from the second controller stack of the peripheral device.

In the host device, the first host stack receives Disconnect Complete from the first controller stack.

The host device and the peripheral device share Conventional Reliable HOGP (GATT Report).

The peripheral device switched to the office mode or basic mode becomes a gaming (disabled) state in relation to the gaming mode characteristic.

Figure 9:
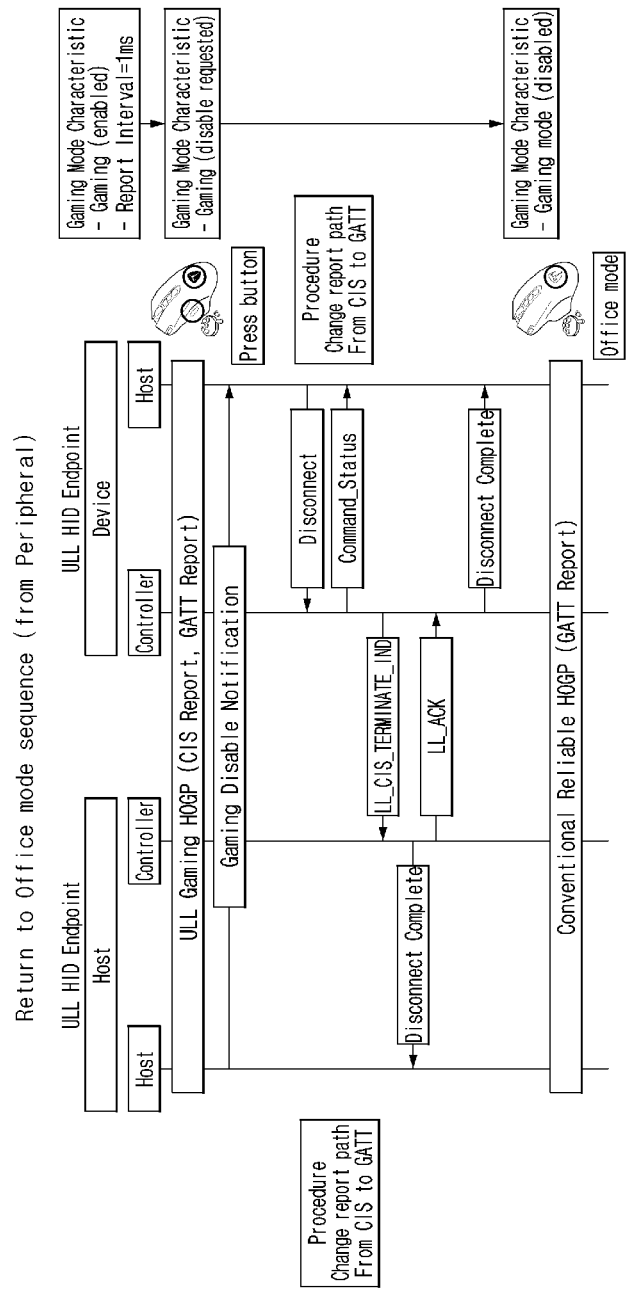
FIG. 9 illustrates an example of a dynamic mode switch in a wireless communication system according to various embodiments of the present disclosure.

FIG. 9 illustrates an example of a dynamic mode switch in a wireless communication system according to various embodiments of the present disclosure.

Specifically, FIG. 9 illustrates a process in which a short-range wireless communication between a central device and a peripheral device (i.e. device) is switched to an office mode or a basic mode based on a command from the peripheral device (i.e. device).

Referring to FIG. 9, a host device and a peripheral device correspond to ULL HID endpoints.

The host device includes a first processor corresponding to a first host stack; and a second processor corresponding to a first controller stack.

The peripheral device includes a third processor corresponding to a second host stack; and a fourth processor corresponding to a second controller stack.

The host device and the peripheral device perform the short-range wireless communication with each other through communication between the first controller stack and the second controller stack.

The host device and the peripheral device perform communication before switching to the office mode or the basic mode, and are connected through a generic attribute profile (GATT) channel and a connected isochronous stream (CIS) channel. The host device and the peripheral device share ULL Gaming HOGP (CIS Report, GATT Report).

The peripheral device may receive an input for switching to the office mode or the basic mode through an input of pressing a specific button, for example, a specific button of a mouse or a game controller. For example, while a game application is running on the host device, the peripheral device that serves as a game controller may receive an input for switching to the office mode or the basic mode by pressing the specific button. Through this, CP procedure of the host device performs the operation of change report path from CIS to GATT. The CP procedure of the peripheral device performs the operation of change report path from CIS to GATT.

The host device receives a Gaming Disable Notification from the peripheral device.

The peripheral device, which was in a gaming mode or a hybrid mode, was in a state of gaming (enabled), report interval=1 ms in relation to a gaming mode characteristic. However, a request for gaming (disable requested) is received from the host device in relation to the gaming mode characteristic.

In the peripheral device, the second host stack transmits a disconnect message to the second controller stack.

In the peripheral device, the second host stack receives Command_Status from the second controller stack.

The first controller stack of the host device transmits LL_CIS_TERMINATE_IND to the second controller stack of the peripheral device.

In the host device, the first host stack receives Disconnect Complete from the first controller stack.

The first controller stack of the host device transmits LL_ACK to the second controller stack of the peripheral device.

In the peripheral device, the second host stack receives Disconnect Complete from the second controller stack.

The host device and the peripheral device share Conventional Reliable HOGP (GATT Report).

The peripheral device switched to the office mode or the basic mode becomes a gaming (disabled) state in relation to the gaming mode characteristic.

Backup-proposal by proposal with all criteria according to various embodiments of the present disclosure is as follows.

Transport ISOCH according to various embodiments of the present disclosure is as follows.

(1) Backwards compatible: Yes, feature bits (2) Meet the requirements: Yes, can do 1 ms with controlled latency (2-1) Some of the less defined use cases may not be possible, these need to be deferred to a later version (may even need HDR)

(3) Specification simplicity: Moderate complexity (3-1) Simple extension of HIDS/HOGP onto a new transport+error concealment (3-2) Core will/may need HCI changes, but no OTA changes (4) Implantation simplicity: Moderate complexity (4-1) Some effort needed on timing to reach the lowest latency (4-1-1) CPU clocks now is >10× what it was when HOGP 1.0 first came out so relatively it's less complex (5) Airtime usage: High (6) Controller usage: High (6-1) Any low latency solution will be high, regardless of ULL design Transport ACL according to various embodiments of the present disclosure is as follows.

(1) Backwards compatible: Yes, feature bits (2) Meet the requirements: Yes, can do 1 ms with controlled latency (2-1) Some of the less defined use cases may not be possible, these need to be deferred to a later version (may even need HDR)

(3) Specification simplicity: High complexity (3-1) Simple extension of HIDS/HOGP onto a new transport+error concealment (3-2) Significant OTA changes to the core (new packet types and new timing)

(4) Implantation simplicity: Moderate complexity (4-1) Some effort needed on timing to reach the lowest latency (4-1-1) Unknown what a capable ACL in core would look like (5) Airtime usage: High at low latency (6) Controller usage: High at low latency (6-1) Any low latency solution will be high, regardless of ULL design Transport broadcast according to various embodiments of the present disclosure is as follows.

(1) Backwards compatible: Yes, feature bits (assuming the ACL from HOGP is kept)

(2) Meet the requirements: Might do. No problem with 1 ms with controlled latency (2-1) Uncertainty: Is no retransmit sufficient with static channel maps?

(2-2) Some of the less defined use cases may not be possible, these need to be deferred to a later version (may even need HDR)

(3) Specification simplicity: High/moderate complexity (3-1) Simple extension of HIDS/HOGP onto a new transport+error concealment (3-2) Core changes needed, but possibly only for timing (4) Implantation simplicity: Moderate complexity (4-1) Some effort needed on timing to reach the lowest latency (4-1-1) Unknown what a capable periodic advertising or BIS in core would look like (4-1-2) Higher complexity if exchanging channel maps for broadcast over the ACL (5) Airtime usage: Moderate at low latency (6) Controller usage: Better than other proposals at any latency setting Discussions according to various embodiments of the present disclosure are as follows.

Discussion 1: Feels anything defined in HID Usage Tables requires reliability. Vendor-specific reports can travel over Isochronous Channels.

Discussion 2: I think there are some HID Usages that are Ok to transmit without reliability. E.g., game controller buttons, button 1, button 2, etc. We may also need to provide guidance that the report be transmitted repeatedly. With enough "over-sampling", the lack of reliability is Ok. Use of vendor-specific usages is one way to flag reports. However, vendor-specific usages can be mixed with HUT-defined usage codes in the same report. Vendor-specific usages can be used for "top-level" application usages as well.

Discussion 3: HUT-defined usages don't necessarily imply need for reliability.

[Description Related to Host Device Claims]

Hereinafter, the above-described embodiments will be described in detail with reference to FIG. 10 in terms of operation of a terminal. The methods described below are only classified for convenience of explanation, and it goes without saying that some configurations of one method may be substituted with some configurations of another method or may be combined and applied to each other, unless mutually excluded.

Figure 10:
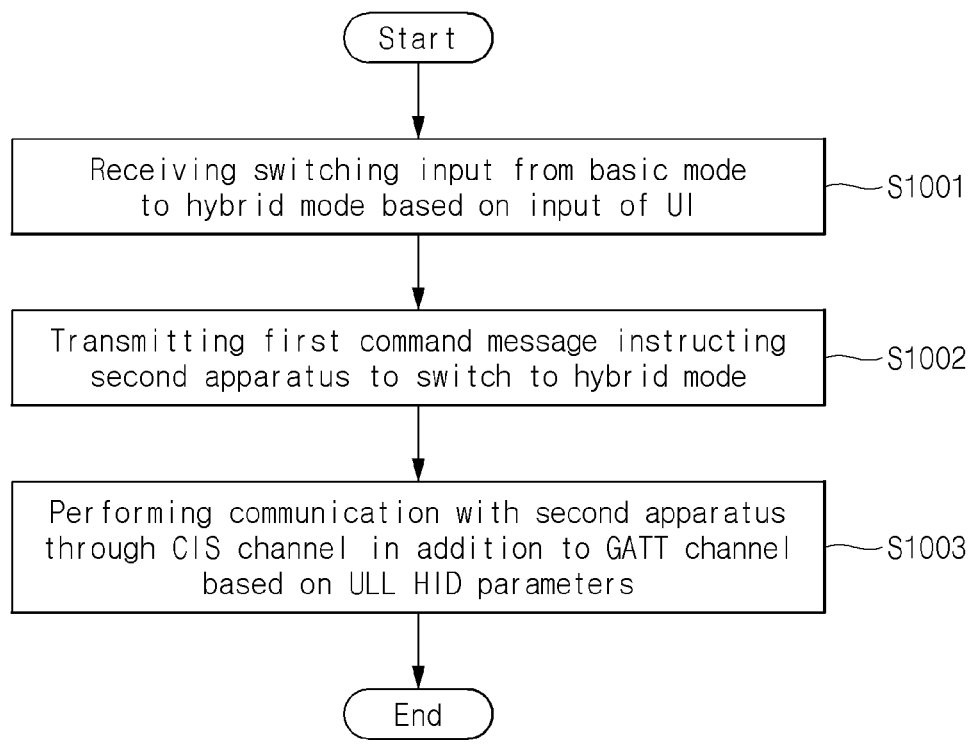
FIG. 10 illustrates an example of an operation process of a wireless apparatus in a short-range wireless communication system according to various embodiments of the present disclosure.

FIG. 10 illustrates an example of an operation process of a wireless apparatus in a short-range wireless communication system according to various embodiments of the present disclosure.

According to various embodiments of the present disclosure, a method performed by a wireless apparatus (i.e. a first apparatus) in a short-range wireless communication system is provided.

The first apparatus includes a first processor corresponding to a host stack; a second processor corresponding to a controller stack; a memory; an input device corresponding to a user interface (UI); an output device corresponding to the UI; and a transceiver. The host stack and the controller stack are connected through a host controller interface (HCI).

In step S1001, the first apparatus receives a switching input from a basic mode to a hybrid mode based on an input of the UI. The first apparatus corresponds to a host, a second apparatus corresponds to a peripheral device, and the first apparatus and the second apparatus are connected through a generic attribute profile (GATT) channel.

In step S1002, the first apparatus transmits a first command message instructing the second apparatus to switch to the hybrid mode. The first command message includes ultra low latency human interface device (ULL HID) parameters.

In step S1003, the first apparatus includes performing communication with the second apparatus through a connected isochronous stream (CIS) channel in addition to the GATT channel based on the ULL HID parameters.

According to various embodiments of the present disclosure, in the basic mode, communication between the first apparatus and the second apparatus may be performed only through the GATT channel. In the hybrid mode, the communication between the first apparatus and the second apparatus may be performed through the GATT channel and the CIS channel.

According to various embodiments of the present disclosure, the embodiment of FIG. may further include receiving a second command message instructing switching to the hybrid mode based on a specific switch input of the second apparatus from the second apparatus, wherein the message includes the ULL HID parameter; and performing communication with the second apparatus through the CIS channel in addition to the GATT channel based on the ULL HID parameter.

According to various embodiments of the present disclosure, the embodiment of FIG. may further include receiving a switching input from the hybrid mode to the basic mode based on the input of the UI; transmitting a third command message instructing the second apparatus to switch from the hybrid mode to the basic mode; and ending communication with the second apparatus through the CIS channel and performing the communication with the second apparatus through the GATT channel.

According to various embodiments of the present disclosure, the embodiment of FIG. may further include receiving a fourth command message instructing switching from the hybrid mode to the basic mode based on a specific switch input of the second apparatus from the second apparatus, wherein the message includes the ULL HID parameter; and ending communication with the second apparatus through the CIS channel and performing the communication with the second apparatus through the GATT channel.

According to various embodiments of the present disclosure, in the hybrid mode, report information may be transmitted from the second apparatus to the first apparatus through the CIS channel. A report interval of the report information may be 1 ms.

According to various embodiments of the present disclosure, when switching from the hybrid mode to the basic mode is performed, report information may be transmitted from the second apparatus to the first apparatus through the GATT channel, and a report interval of the report information may be changed to 1 ms or more.

According to various embodiments of the present disclosure, a wireless apparatus is provided in a short-distance wireless communication system. The wireless apparatus includes a first processor corresponding to a host stack; a second processor corresponding to a first controller stack; a memory; an input device corresponding to a user interface (UI); an output device corresponding to the UI; and a transceiver. The host stack and the controller stack are connected through a host controller interface (HCI). The memory may be configured to store instructions for performing an operating method of the first apparatus according to FIG. 10 based on being executed by the first processor and the second processor.

According to various embodiments of the present disclosure, a control device for controlling a wireless apparatus in a short-range wireless communication system is provided. The control device includes at least one processor and at least one memory operatively connected to the at least one processor. The at least one memory may be configured to store instructions for performing the operating method of the first apparatus according to FIG. 10 based on being executed by the at least one processor.

According to various embodiments of the present disclosure, one or more non-transitory computer readable mediums (CRMs) storing one or more instructions are provided. The one or more instructions may perform operations based on being executed by one or more processors, and the operations may include the method of operating the first apparatus according to FIG. 10.

[Description Related to Peripheral Device Claims]

Hereinafter, the above-described embodiments will be described in detail with reference to FIG. 11 in terms of operation of a terminal. The methods described below are only classified for convenience of explanation, and it goes without saying that some configurations of one method may be substituted with some configurations of another method or may be combined and applied to each other, unless mutually excluded.

Figure 11:
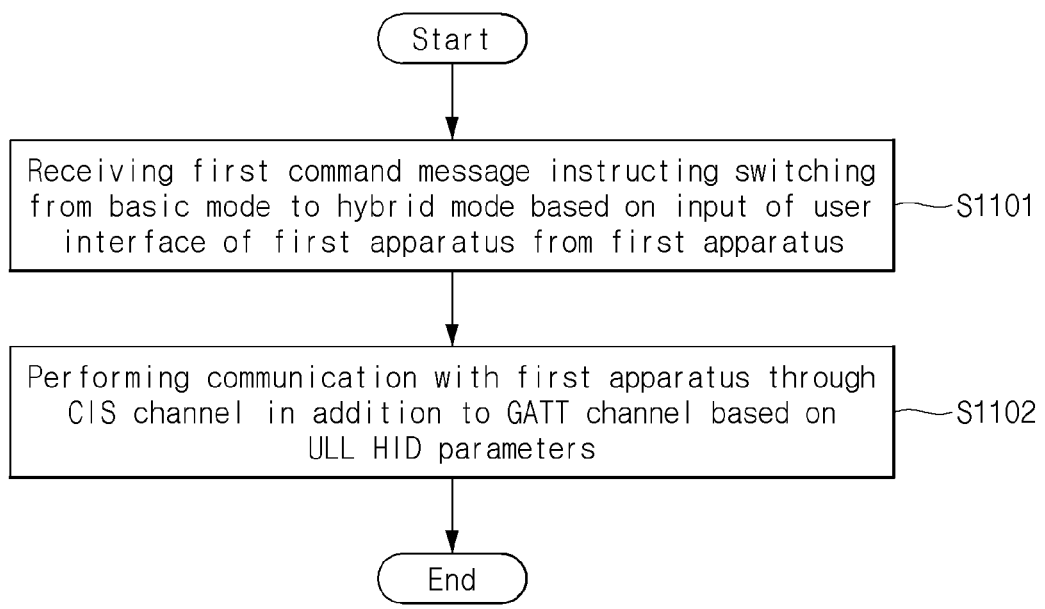
FIG. 11 illustrates an example of an operation process of a wireless apparatus in a short-range wireless communication system according to various embodiments of the present disclosure.

FIG. 11 illustrates an example of an operation process of a wireless apparatus in a short-range wireless communication system according to various embodiments of the present disclosure.

According to various embodiments of the present disclosure, a method performed by a wireless apparatus (i.e. a second apparatus) in a short-range wireless communication system is provided.

The second apparatus includes a first processor corresponding to a host stack; a second processor corresponding to a controller stack; a memory; a specific switch for an input; and a transceiver. The host stack and the second controller stack are connected through a host controller interface (HCI).

In step S1101, the second apparatus receives a first command message instructing switching from a basic mode to a hybrid mode based on an input of a user interface (UI) of a first apparatus from the first apparatus. The first apparatus corresponds to a host, the second apparatus corresponds to a peripheral device, and the first apparatus and the second apparatus are connected through a generic attribute profile (GATT) channel. The first command message includes ultra low latency human interface device (ULL HID) parameters.

In step S1102, the second apparatus performs communication with the first apparatus through a connected isochronous stream (CIS) channel in addition to the GATT channel based on the ULL HID parameters.

According to various embodiments of the present disclosure, in the basic mode, communication between the first apparatus and the second apparatus may be performed only through the GATT channel. In the hybrid mode, the communication between the first apparatus and the second apparatus may be performed through the GATT channel and the CIS channel.

According to various embodiments of the present disclosure, the embodiment of FIG. 11 may further include transmitting a second command message instructing switching to the hybrid mode based on a specific switch input of the second apparatus from the first apparatus, wherein the message includes the ULL HID parameter; and performing communication with the first apparatus through the CIS channel in addition to the GATT channel based on the ULL HID parameter.

According to various embodiments of the present disclosure, the embodiment of FIG. 11 may further include receiving a third command message instructing switching from the hybrid mode to the basic mode based on the input of the UI of the first apparatus from the first apparatus; and ending communication with the second apparatus through the CIS channel and performing the communication with the second apparatus through the GATT channel.

According to various embodiments of the present disclosure, the embodiment of FIG. 11 may further include receiving a fourth command message instructing switching from the hybrid mode to the basic mode based on a specific switch input of the second apparatus to the first apparatus, wherein the message includes the ULL HID parameter; and ending communication with the second apparatus through the CIS channel and performing the communication with the second apparatus through the GATT channel.

According to various embodiments of the present disclosure, in the hybrid mode, report information may be transmitted from the second apparatus to the first apparatus through the CIS channel, and a report interval of the report information may be 1 ms.

According to various embodiments of the present disclosure, when switching from the hybrid mode to the basic mode is performed, report information may be transmitted from the second apparatus to the first apparatus through the GATT channel, and a report interval of the report information may be changed to 1 ms or more.

According to various embodiments of the present disclosure, a wireless apparatus is provided in a short-range wireless communication system. The wireless apparatus includes a first processor corresponding to a host stack; a second processor corresponding to a controller stack; a memory; a specific switch for an input; and a transceiver. The host stack and the second controller stack are connected through a host controller interface (HCI). The memory may be configured to store instructions for performing the operating method of the second apparatus according to FIG. 11 based on being executed by the first processor and the second processor.

According to various embodiments of the present disclosure, a control device for controlling a wireless apparatus in a short-range wireless communication system is provided. The control device includes at least one processor and at least one memory operatively connected to the at least one processor. The at least one memory may be configured to store instructions for performing the operating method of the second apparatus according to FIG. 11 based on being executed by the at least one processor.

According to various embodiments of the present disclosure, one or more non-transitory computer readable mediums (CRMs) storing one or more instructions are provided. The one or more instructions may perform operations based on being executed by one or more processors, and the operations may include the method of operating the second apparatus according to FIG. 11.

Claims described in the present disclosure can be combined in a various way. For instance, technical features in method claims of the present disclosure can be combined to be implemented as an apparatus, and technical features in apparatus claims can be combined to be implemented as a method. Further, technical features in method claim and apparatus claim can be combined to be implemented as an apparatus. Further, technical features in method claim and apparatus claim can be combined to be implemented as a method.

What is claimed is:

1. A method of operating a first apparatus in a short-range wireless communication system,
   the first apparatus comprises:
   a first processor corresponding to a host stack;
   a second processor corresponding to a controller stack;
   a memory;
   an input device corresponding to a user interface (UI);
   an output device corresponding to the UI; and
   a transceiver,
   wherein the host stack and the controller stack are connected through a host controller interface (HCI),
   the method comprising:
   receiving a switching input from a basic mode to a hybrid mode based on an input of the UI, wherein the first apparatus corresponds to a host, a second apparatus corresponds to a peripheral device, and the first apparatus and second apparatus are connected through a generic attribute profile (GATT) channel;
   transmitting a first command message instructing the second apparatus to switch to the hybrid mode, wherein the first command message includes ultra low latency human interface device (ULL HID) parameters; and
   performing communication with the second apparatus through a connected isochronous stream (CIS) channel in addition to the GATT channel based on the ULL HID parameters.

2. The method of claim 1, where, in the basic mode, communication between the first apparatus and the second apparatus is performed only through the GATT channel; and
   in the hybrid mode, the communication between the first apparatus and the second apparatus is performed through the GATT channel and the CIS channel.

3. The method of claim 1, further comprising:
   receiving a second command message instructing switching to the hybrid mode based on a specific switch input of the second apparatus from the second apparatus, wherein the message includes the ULL HID parameter; and
   performing communication with the second apparatus through the CIS channel in addition to the GATT channel based on the ULL HID parameter.

4. The method of claim 1, further comprising:
   receiving a switching input from the hybrid mode to the basic mode based on the input of the UI;
   transmitting a third command message instructing the second apparatus to switch from the hybrid mode to the basic mode; and
   ending communication with the second apparatus through the CIS channel and performing the communication with the second apparatus through the GATT channel.

5. The method of claim 1, further comprising:
   receiving a fourth command message instructing switching from the hybrid mode to the basic mode based on a specific switch input of the second apparatus from the second apparatus, wherein the message includes the ULL HID parameter; and ending communication with the second apparatus through the CIS channel and performing the communication with the second apparatus through the GATT channel.

6. The method of claim 1, wherein, in the hybrid mode, report information is transmitted from the second apparatus to the first apparatus through the CIS channel, and a report interval of the report information is 1 ms.

7. The method of claim 4, wherein when switching from the hybrid mode to the basic mode is performed, report information is transmitted from the second apparatus to the first apparatus through the GATT channel, and a report interval of the report information is changed to 1 ms or more.

8. A method of operating a second apparatus in a short-range wireless communication system, the second apparatus comprises:

a first processor corresponding to a host stack;

a second processor corresponding to a controller stack;

a memory;

a specific switch for input; and a transceiver, wherein the host stack and the controller stack are connected through a host controller interface (HCI), the method comprising:

receiving a first command message instructing switching from a basic mode to a hybrid mode based on an input of a user interface (UI) of a first apparatus from the first apparatus, wherein the first apparatus corresponds to a host, the second apparatus corresponds to a peripheral device, and the first apparatus and the second apparatus are connected through a generic attribute profile (GATT) channel, and the first command message includes ultra low latency human interface device (ULL HID) parameters; and performing communication with the first apparatus through a connected isochronous stream (CIS) channel in addition to the GATT channel based on the ULL HID parameters.

9. The method of claim 8, wherein, in the basic mode, communication between the first apparatus and the second apparatus is performed only through the GATT channel; and in the hybrid mode, the communication between the first apparatus and the second apparatus is performed through the GATT channel and the CIS channel.

10. The method of claim 8, further comprising:

transmitting a second command message instructing switching to the hybrid mode based on a specific switch input of the second apparatus from the first apparatus, wherein the message includes the ULL HID parameter; and performing communication with the first apparatus through the CIS channel in addition to the GATT channel based on the ULL HID parameter.

11. The method of claim 8, further comprising:

receiving a third command message instructing switching from the hybrid mode to the basic mode based on the input of the UI of the first apparatus from the first apparatus; and ending communication with the second apparatus through the CIS channel and performing the communication with the second apparatus through the GATT channel.

12. The method of claim 8, further comprising:

receiving a fourth command message instructing switching from the hybrid mode to the basic mode based on a specific switch input of the second apparatus to the first apparatus, wherein the message includes the ULL HID parameter; and ending communication with the second apparatus through the CIS channel and performing the communication with the second apparatus through the GATT channel.

13. The method of claim 8, wherein, in the hybrid mode, report information is transmitted from the second apparatus to the first apparatus through the CIS channel, and a report interval of the report information is 1 ms.

14. The method of claim 11, wherein when switching from the hybrid mode to the basic mode is performed, report information is transmitted from the second apparatus to the first apparatus through the GATT channel, and a report interval of the report information is changed to 1 ms or more.

15. A first apparatus in a short-range wireless communication system, the first apparatus comprising:

a first processor corresponding to a host stack;

a second processor corresponding to a first controller stack;

a memory;

an input device corresponding to a user interface (UI);

an output device corresponding to the UI; and a transceiver, wherein the host stack and the controller stack are connected through a host controller interface (HCI), wherein the memory store instructions for performing operations based on being executed by the first processor and the second processor, and wherein the operations comprises:

receiving a switching input from a basic mode to a hybrid mode based on an input of the UI, wherein the first apparatus corresponds to a host, a second apparatus corresponds to a peripheral device, and the first apparatus and second apparatus are connected through a generic attribute profile (GATT) channel;

transmitting a first command message instructing the second apparatus to switch to the hybrid mode, wherein the first command message includes ultra low latency human interface device (ULL HID) parameters; and performing communication with the second apparatus through a connected isochronous stream (CIS) channel in addition to the GATT channel based on the ULL HID parameters.

16. The apparatus of claim 15, wherein, in the basic mode, communication between the first apparatus and the second apparatus is performed only through the GATT channel; and in the hybrid mode, the communication between the first apparatus and the second apparatus is performed through the GATT channel and the CIS channel.

17. The apparatus of claim 15, wherein the operations further includes:

receiving a second command message instructing switching to the hybrid mode based on a specific switch input of the second apparatus from the second apparatus, wherein the message includes the ULL HID parameter; and performing communication with the second apparatus through the CIS channel in addition to the GATT channel based on the ULL HID parameter.

18. The apparatus of claim 15, wherein the operations further includes:

receiving a switching input from the hybrid mode to the basic mode based on the input of the UI;

transmitting a third command message instructing the second apparatus to switch from the hybrid mode to the basic mode; and ending communication with the second apparatus through the CIS channel and performing the communication with the second apparatus through the GATT channel.

19. The apparatus of claim 15, wherein the operations further includes:

receiving a fourth command message instructing switching from the hybrid mode to the basic mode based on a specific switch input of the second apparatus from the second apparatus, wherein the message includes the ULL HID parameter; and ending communication with the second apparatus through the CIS channel and performing the communication with the second apparatus through the GATT channel.

20. The apparatus of claim 15, wherein, in the hybrid mode, report information is transmitted from the second apparatus to the first apparatus through the CIS channel, and a report interval of the report information is 1 ms.

* * * * *